United States Patent [19]

Coppa

[11] Patent Number: 4,930,930

[45] Date of Patent: Jun. 5, 1990

[54] TRUSS BEAM ATTACHMENT APPARATUS

[75] Inventor: Anthony P. Coppa, Merion Station, Pa.

[73] Assignee: General Electric Company, King of Prussia, Pa.

[21] Appl. No.: 287,201

[22] Filed: Dec. 21, 1988

[51] Int. Cl.$^5$ .......................... F16B 1/00; E04H 12/00
[52] U.S. Cl. .................................... 403/171; 403/170; 403/172; 403/176; 403/205; 403/403; 52/645; 52/648; 52/693
[58] Field of Search ............... 403/403, 205, 324, 318, 403/316, 306, 49, 218, 170, 171, 174, 176, 178; 52/645, 646, 648, 108, 693, 632, 690; 14/14

[56] References Cited

U.S. PATENT DOCUMENTS

| | | |
|---|---|---|
| 407,993 | 7/1889 | Bullock . |
| 714,402 | 11/1902 | Sager et al. . |
| 2,940,709 | 6/1960 | Neuwirth ............................ 248/168 |
| 3,220,152 | 11/1965 | Sturm .................................... 52/648 |
| 3,221,464 | 12/1965 | Miller .................................... 52/655 |
| 3,272,540 | 9/1966 | Glanzer ................................. 287/54 |
| 3,296,755 | 1/1967 | Chisholm .............................. 52/741 |
| 3,345,793 | 10/1967 | Cvikl .................................... 56/655 |
| 3,563,580 | 2/1971 | Black ............................ 287/189.36 |
| 3,722,153 | 3/1973 | Baer ...................................... 52/81 |
| 3,789,562 | 2/1974 | DeChicchis et al. ................. 52/648 |
| 4,069,832 | 1/1978 | Bingham ............................ 135/3 R |
| 4,259,821 | 4/1981 | Bush ................................. 52/309.1 |
| 4,308,699 | 1/1982 | Slysh .................................... 52/108 |
| 4,334,816 | 6/1982 | Slysh .................................... 414/10 |
| 4,337,560 | 7/1982 | Slysh ............................... 29/155 R |
| 4,395,004 | 7/1983 | Ganssle et al. ................. 244/158 R |
| 4,437,288 | 3/1984 | Foissac et al. ........................ 52/637 |
| 4,450,851 | 5/1984 | Beavers ............................. 135/109 |
| 4,480,415 | 11/1984 | Truss .................................... 52/108 |
| 4,524,552 | 6/1985 | Hujsak .................................. 52/108 |
| 4,557,097 | 12/1985 | Mikulas, Jr. et al. ................. 52/646 |
| 4,580,922 | 4/1986 | Coppa ................................. 403/403 |
| 4,601,152 | 7/1986 | Coppa .................................. 52/637 |
| 4,602,470 | 7/1986 | Stuart et al. .......................... 52/655 |
| 4,633,566 | 1/1987 | Coppa ................................... 29/429 |
| 4,637,193 | 1/1987 | Lange ................................... 52/648 |
| 4,644,628 | 2/1987 | Coppa ................................... 29/429 |
| 4,646,504 | 3/1987 | Britvec ................................. 52/648 |
| 4,745,724 | 5/1988 | Reetz .................................... 52/632 |

FOREIGN PATENT DOCUMENTS

| | | | |
|---|---|---|---|
| 48312 | 12/1983 | European Pat. Off. ............ 244/159 |
| 2025704 | 12/1971 | Fed. Rep. of Germany ........ 52/637 |
| 1350920 | 5/1964 | France .............................. 403/327 |
| 6716751 | 6/1968 | Netherlands . |
| 354919 | 7/1961 | Switzerland ..................... 29/155 R |
| 476429 | 12/1937 | United Kingdom . |
| 609912 | 10/1948 | United Kingdom . |

OTHER PUBLICATIONS

"Building on Space's Potential," USA Today, 11/29/85, p. 3A.
"NASA Selects Station Contractors Despite Funding Uncertainties," Aviation Week & Space Technology, Dec. 7, 1987, pp. 18–19.
"McDonnell Douglas Team Will Plan Assembly of Key Elements in Space," Aviation Week & Space Technology, Dec. 7, 1987, pp. 22–23.

Primary Examiner—Randolph A. Reese
Assistant Examiner—Franco Deliguori
Attorney, Agent, or Firm—Raymond E. Smiley; Clement A. Berard, Jr.

[57] ABSTRACT

The invention relates to a connective apparatus between a truss beam and another object, e.g., a second truss beam or another device, for rigidly joining the two together. The connective apparatus comprises a unitary attachment device which is connected to one of the frame elements in a truss beam. The device includes a rabbet member capable of attachment to a pair of struts of the frame element and a connector member attached to the rabbet member. A connector strut is provided for joining two or more truss beams to each other by interconnecting two nodes of the respective beams.

15 Claims, 25 Drawing Sheets

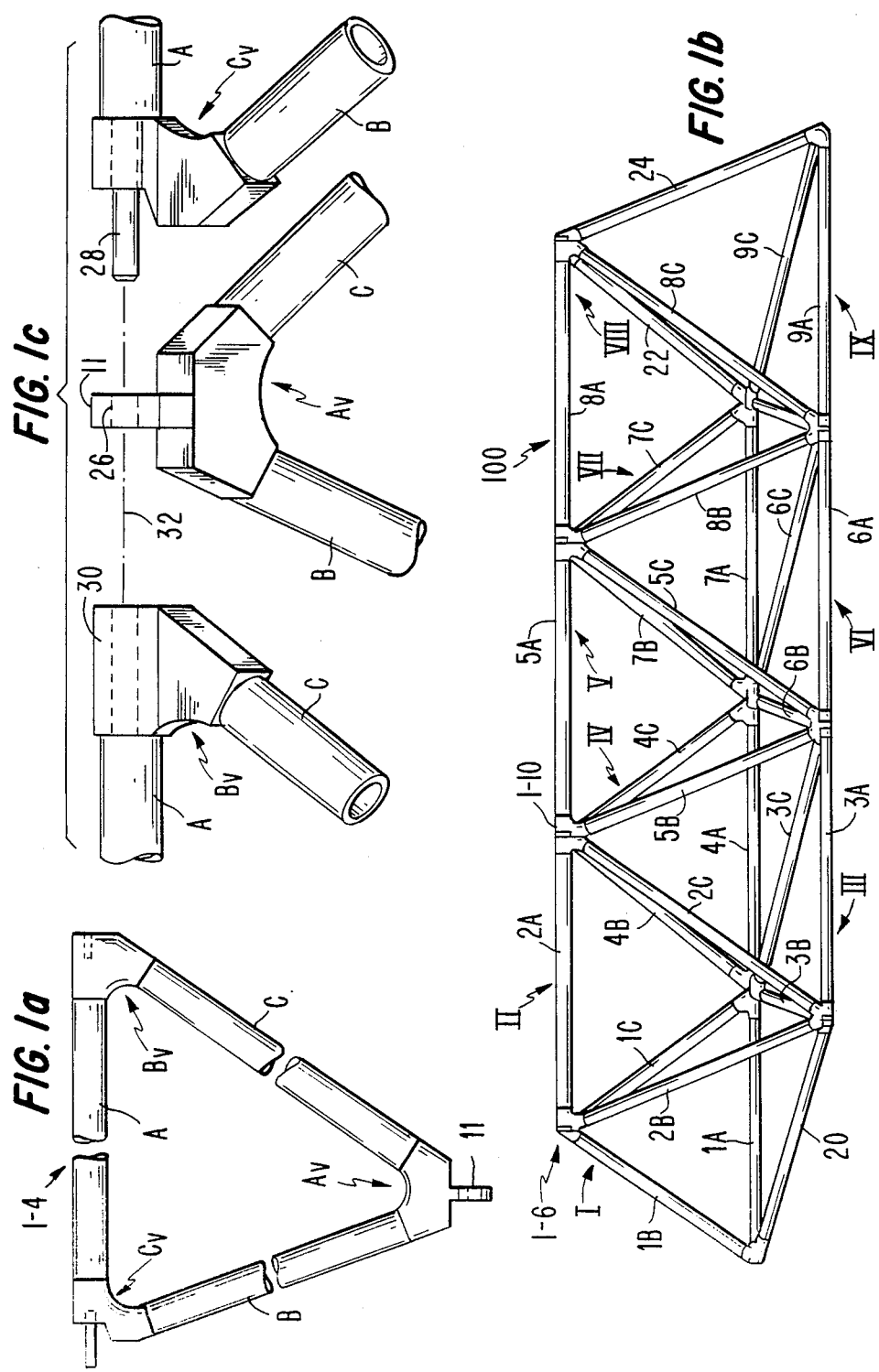

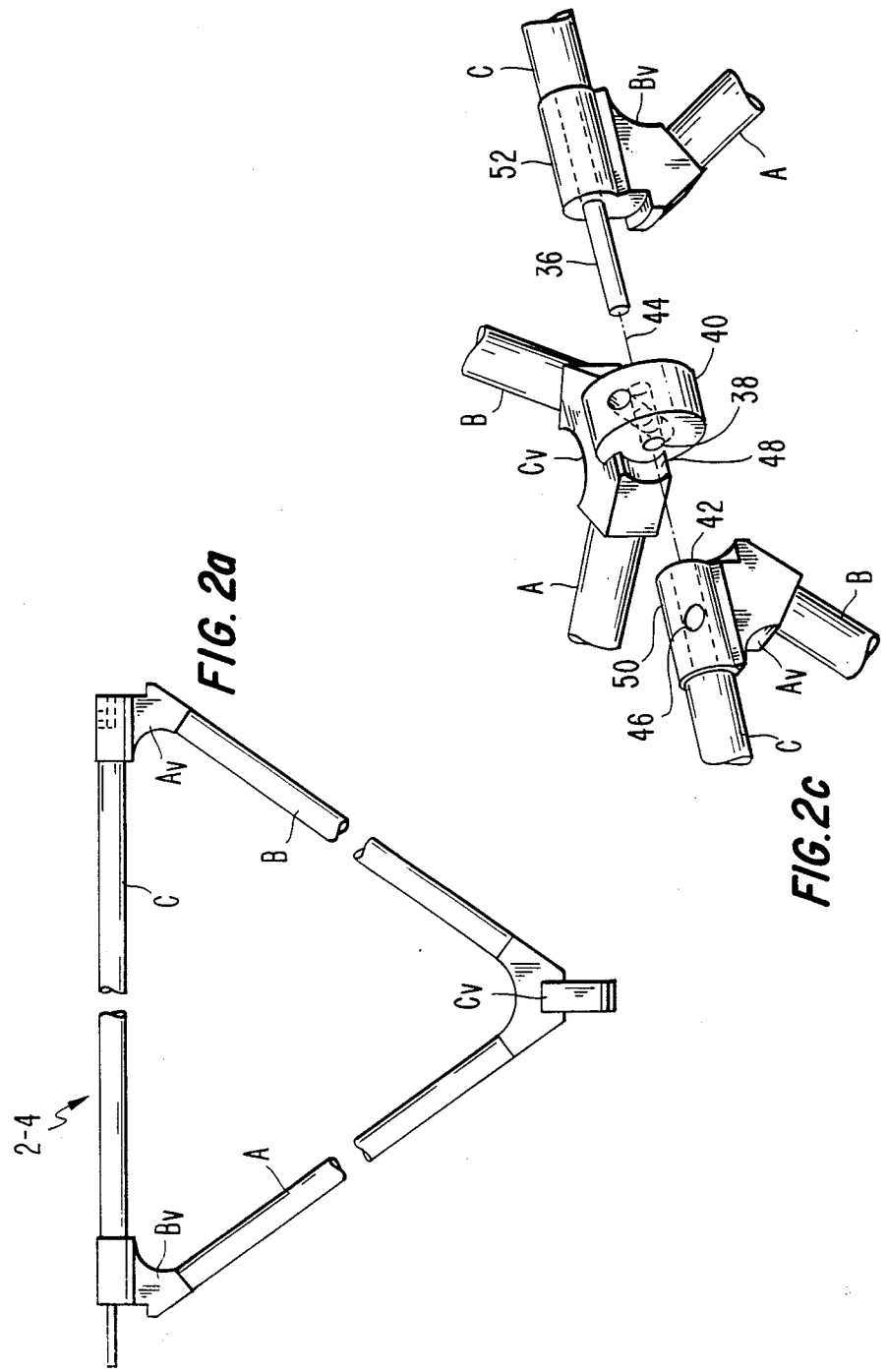

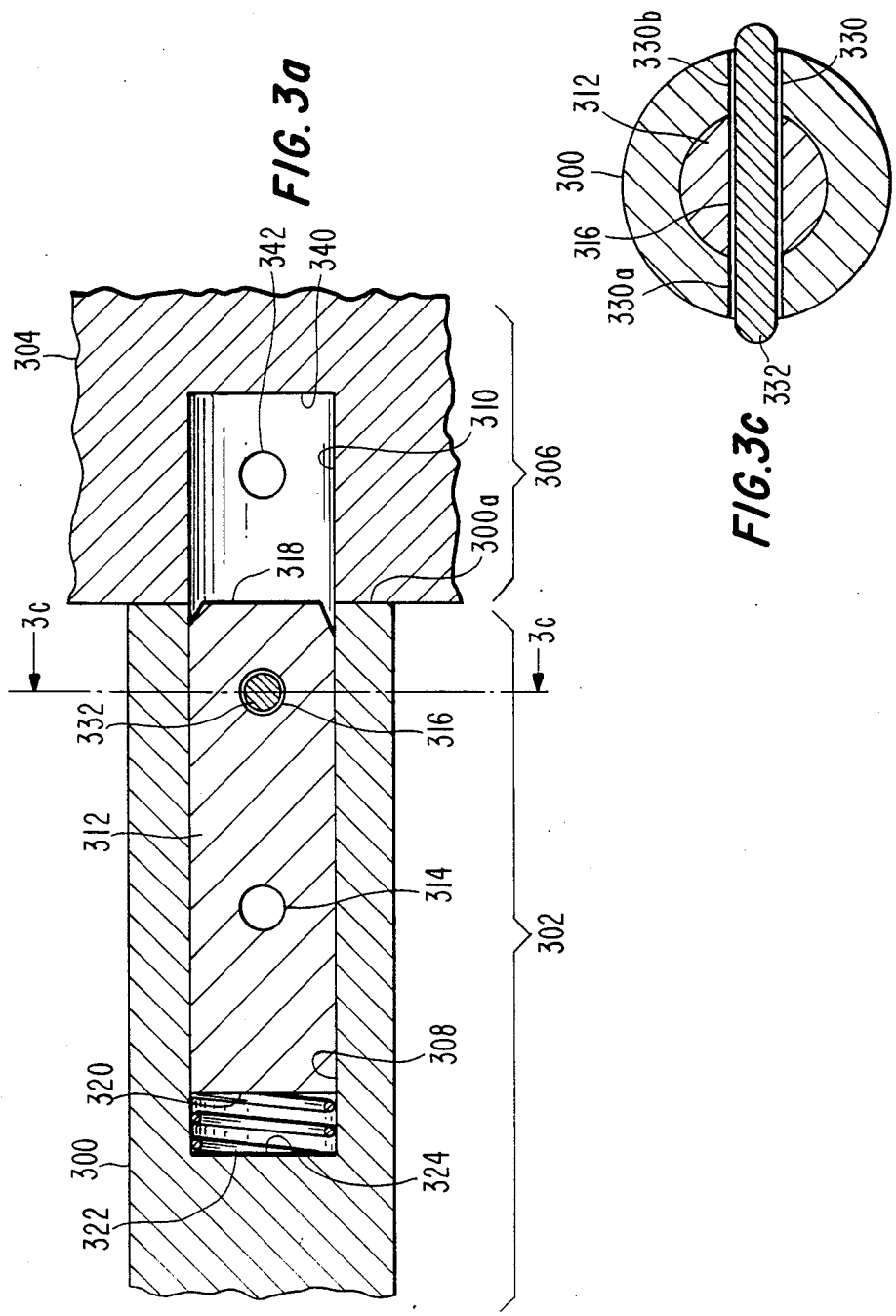

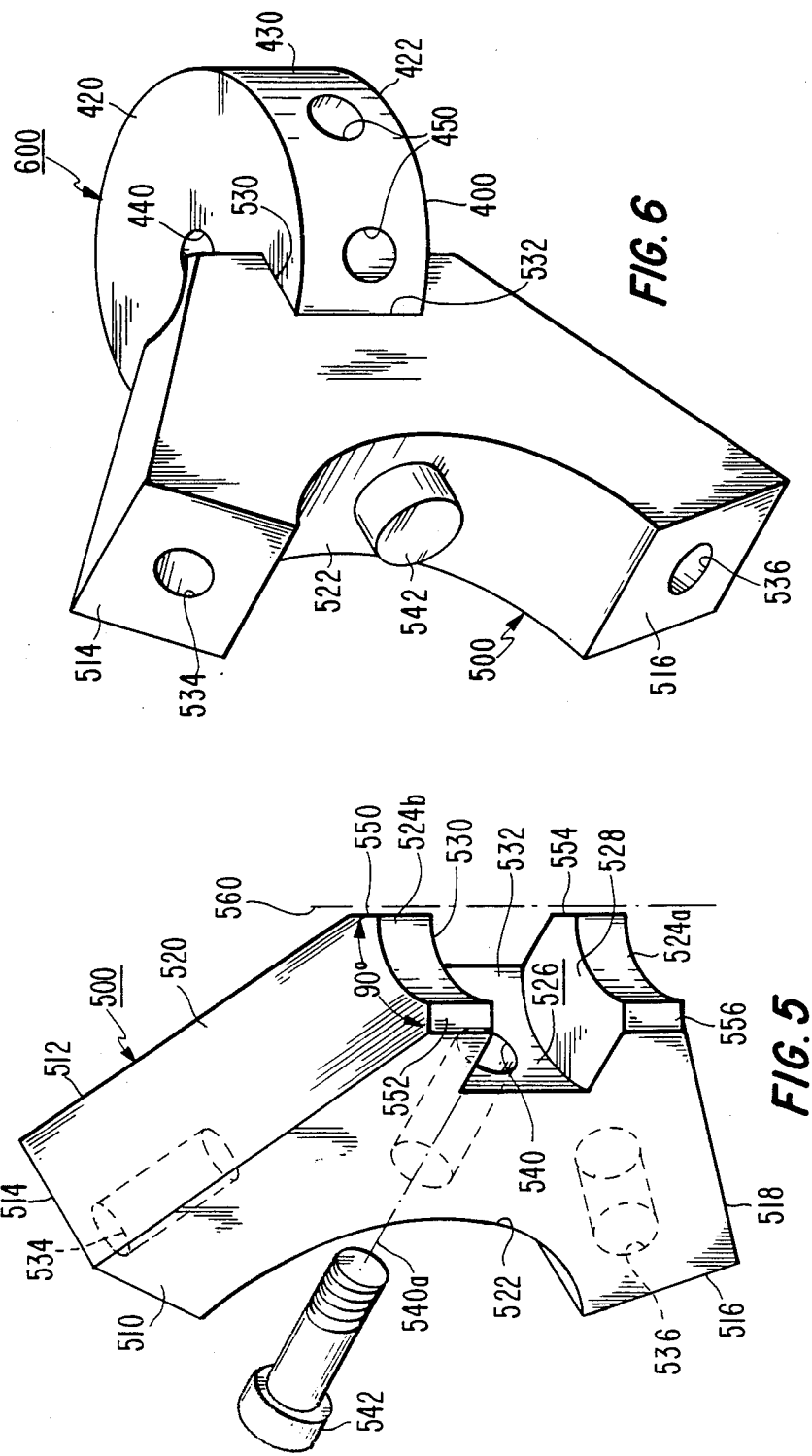

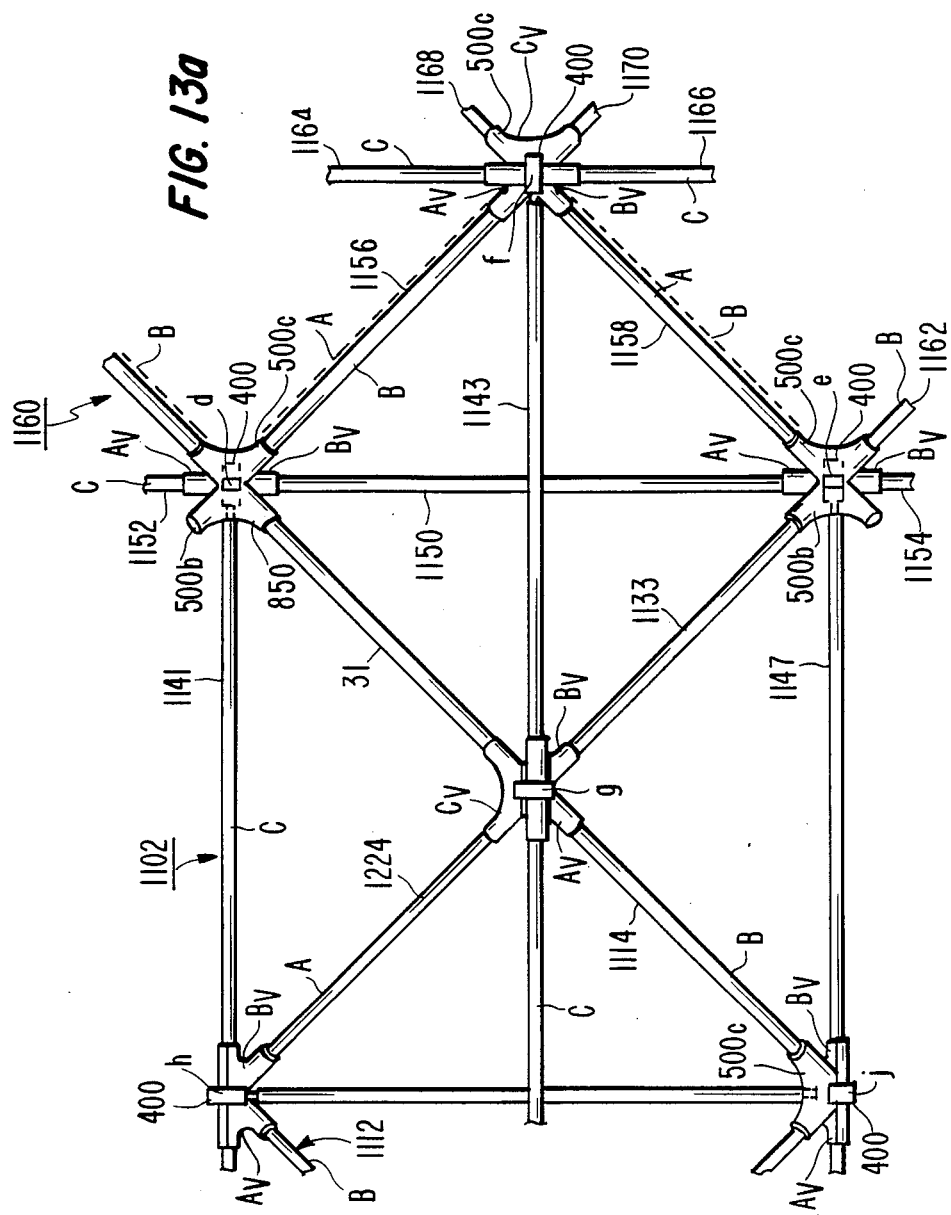

4,930,930

1

TRUSS BEAM ATTACHMENT APPARATUS

The present invention relates in general to new and improved truss beam structures and in particular to apparatus for connecting a plurality of multilateral truss beams to each other or for connecting other devices thereto.

BACKGROUND OF THE INVENTION

Truss beams constructed by interconnecting a plurality of triangular frame elements to form an elongate structure having an equilateral cross-section have previously been disclosed by the instant inventor. An example of a prior art triangular truss beam and its constituent elements and interconnections is depicted in FIGS. 1a to 1c and is illustrated, described and claimed in U.S. Pat. No. 4,633,566 issued Jan. 6, 1987 to the instant inventor and assigned to the assignee of the instant application. An example of a square truss beam and its constituent elements and interconnections, as disclosed in copending application Ser. No. 808,602, filed Dec. 12, 1985 by the instant inventor, and assigned to the assignee of the instant application, is depicted in FIGS. 2a to 2c. Although the beams shown in FIGS. 1b and 2b can be constructed to any desired length within practical limits, they do not readily lend themselves to being interconnected to form larger multi-dimensional structures such as may be desired in a non-terrestrial environment. For example, while it is possible to simply butt the end of one beam against the side of another beam and to join them by conventional techniques, such an attachment will result in double strutting, i.e., a strut of one beam will be parallel and adjacent to a strut of the other beam. Furthermore, in a non-terrestrial environment beams so constructed may be difficult to join by the use of conventional techniques. A similar problem arises when it is desired to attach equipment or other devices to such a beam.

SUMMARY OF THE INVENTION

In accordance with a preferred embodiment of the present invention, connective apparatus between a truss beam and another object, e.g., a second truss beam or another device, for rigidly joining the two together comprises a unitary attachment device which is connected to one of the frame elements in a truss beam. The device includes a rabbet member capable of attachment to a pair of struts of the frame element and a connector member attached to the rabbet member. A connector strut is provided for joining two or more truss beams to each other by interconnecting two nodes of the respective beams.

BRIEF DESCRIPTION OF THE DRAWINGS

FIGS. 1a, 1b, and 1c, illustrate, respectively, a frame element of triangular shape for a triangular cross-sectioned beam, a triangular beam including a plurality of such frame elements, and an exploded node of the triangular beam;

FIGS. 2a, 2b, and 2c, illustrate, respectively, a frame element of triangular shape for a square cross-section beam, a square beam including a plurality of such elements, and an exploded node of the square beam;

FIGS. 3a and 3b illustrate structure in cross-section for connecting two members together;

FIGS. 3c and 3d are cross-section views of FIG. 3b;

2

Figure 4A:
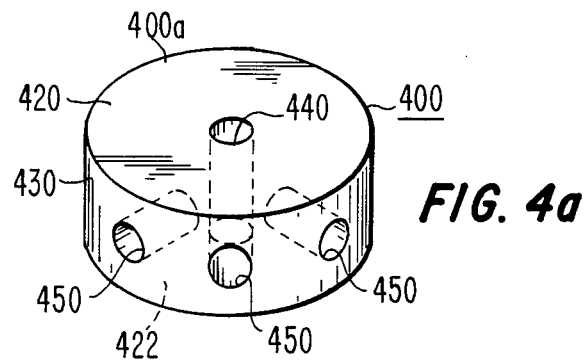
Figure 4B:
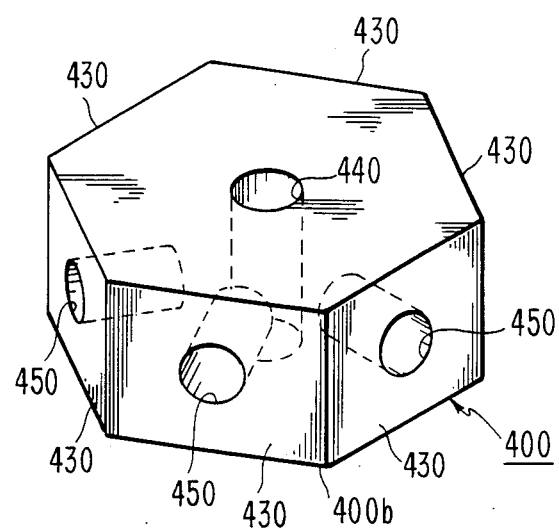
Figure 4C:
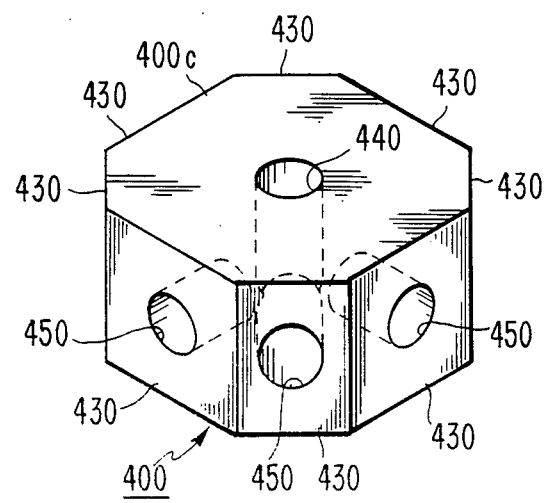
Figure 7:
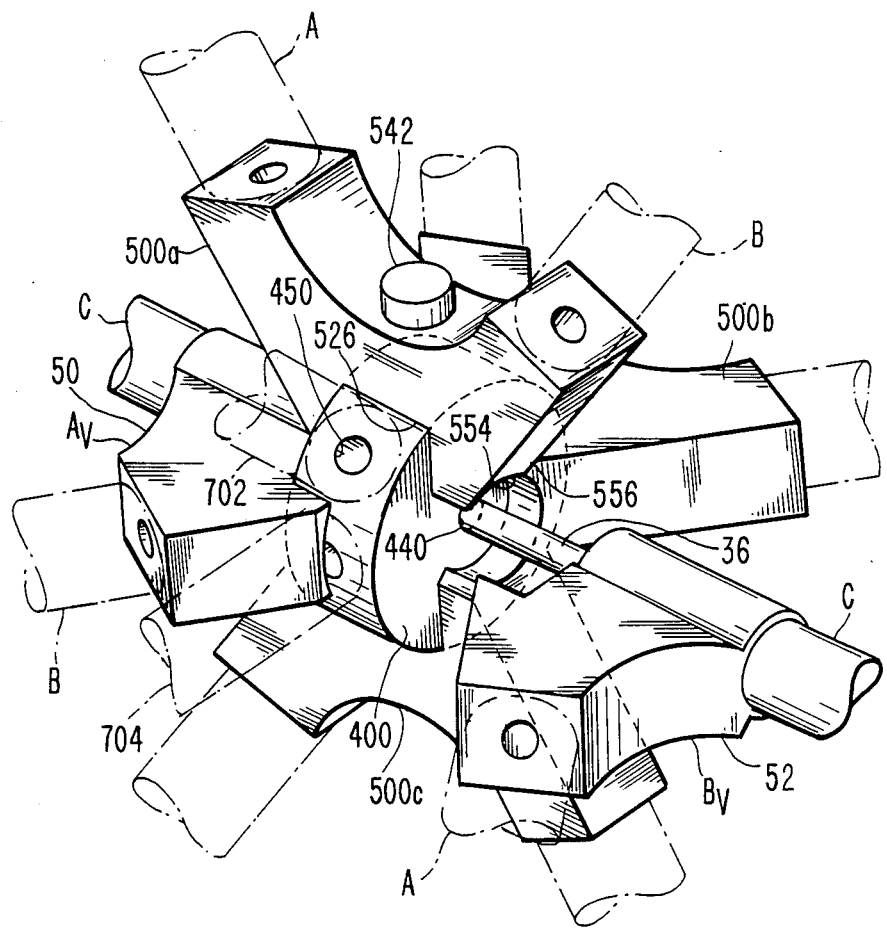
Figure 9:
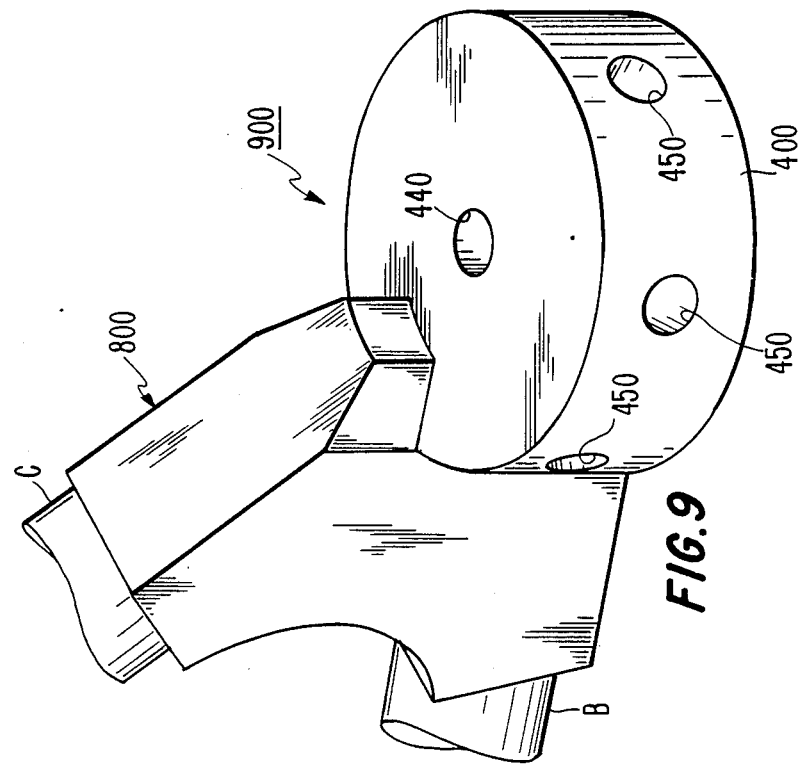
Figure 8:
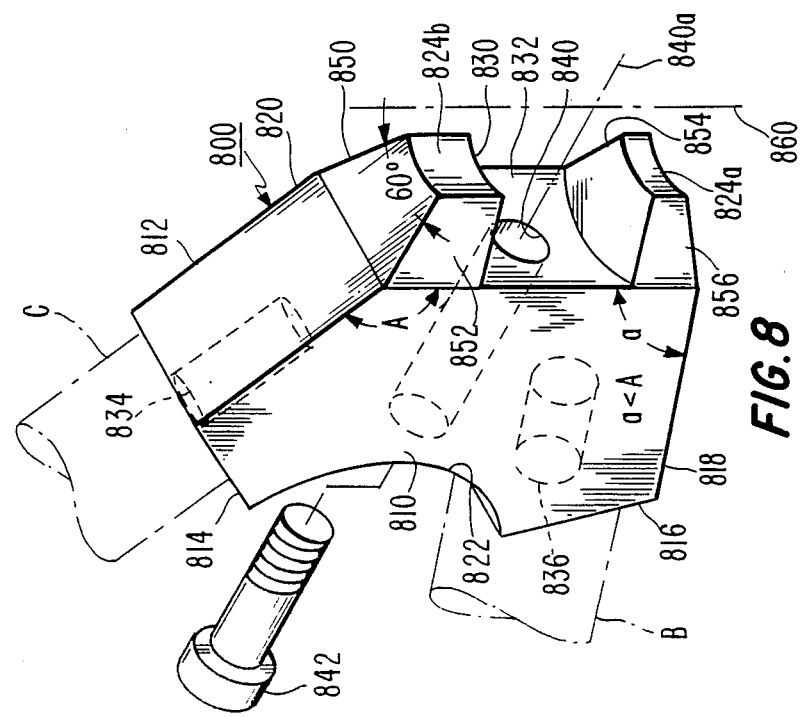
Figure 10:
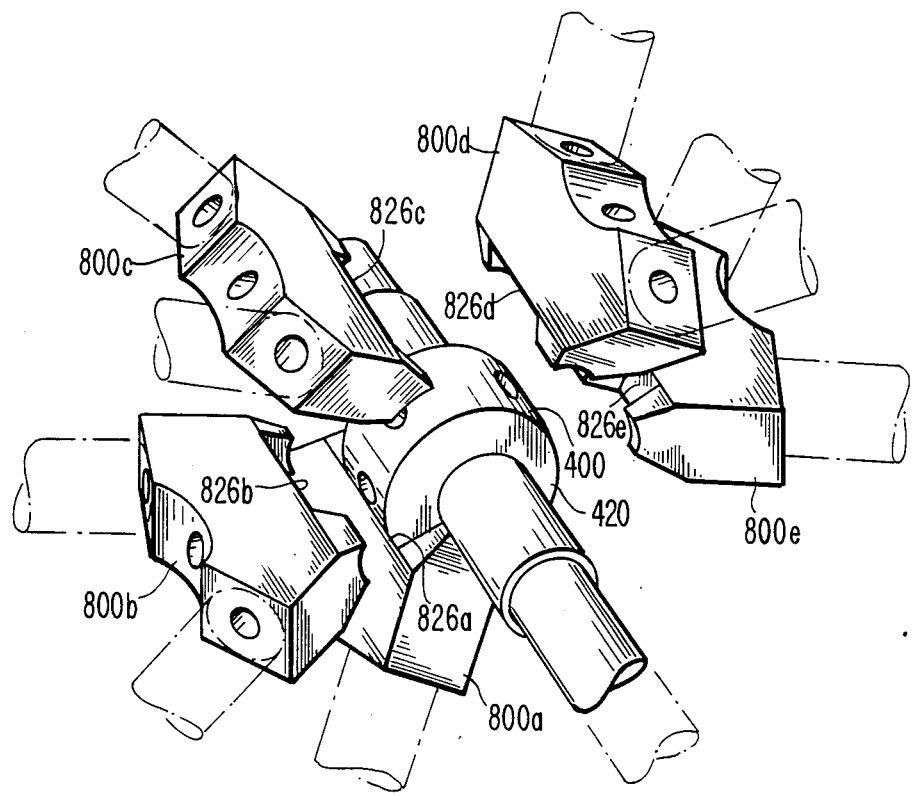
Figure 11:
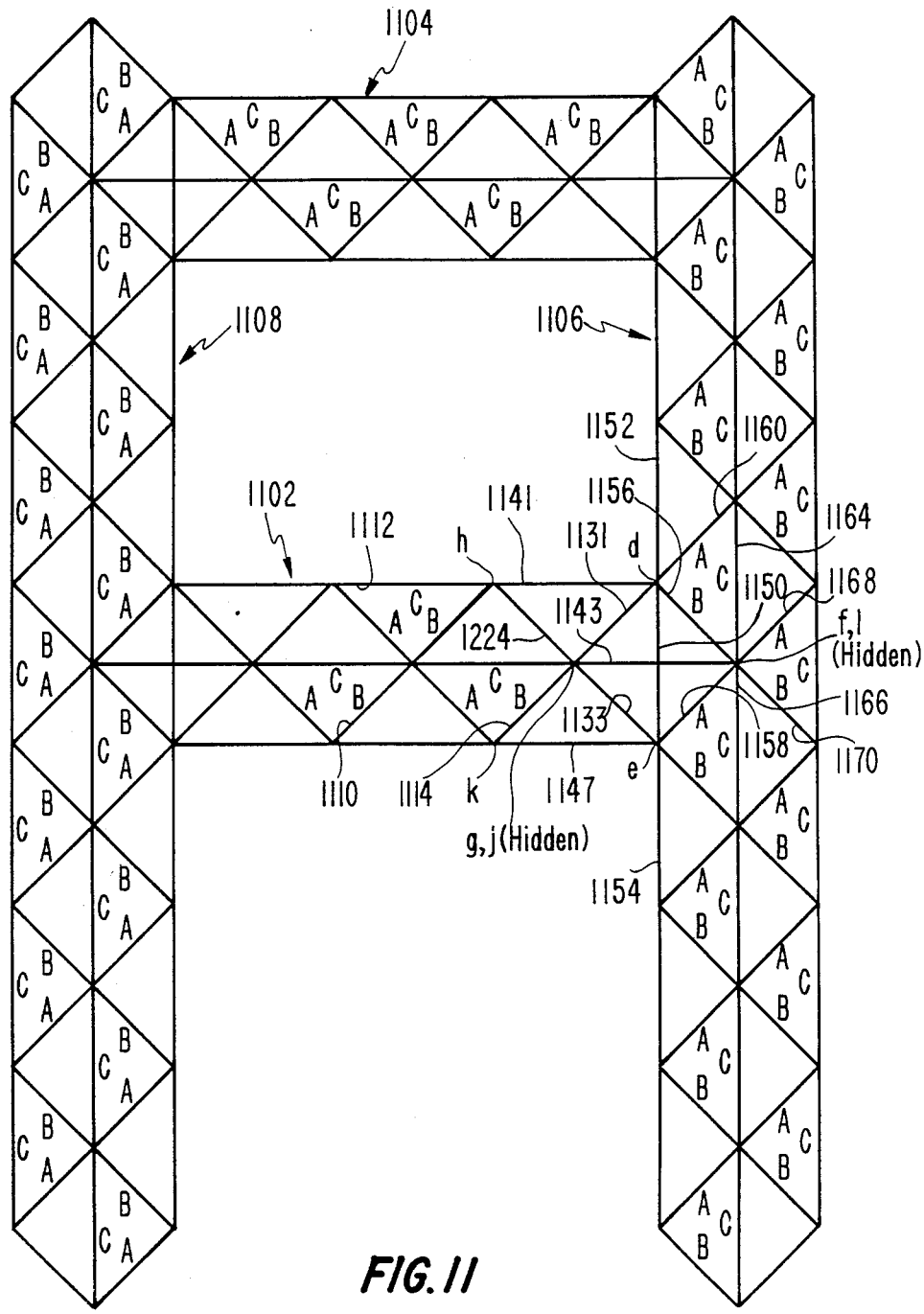
Figure 12:
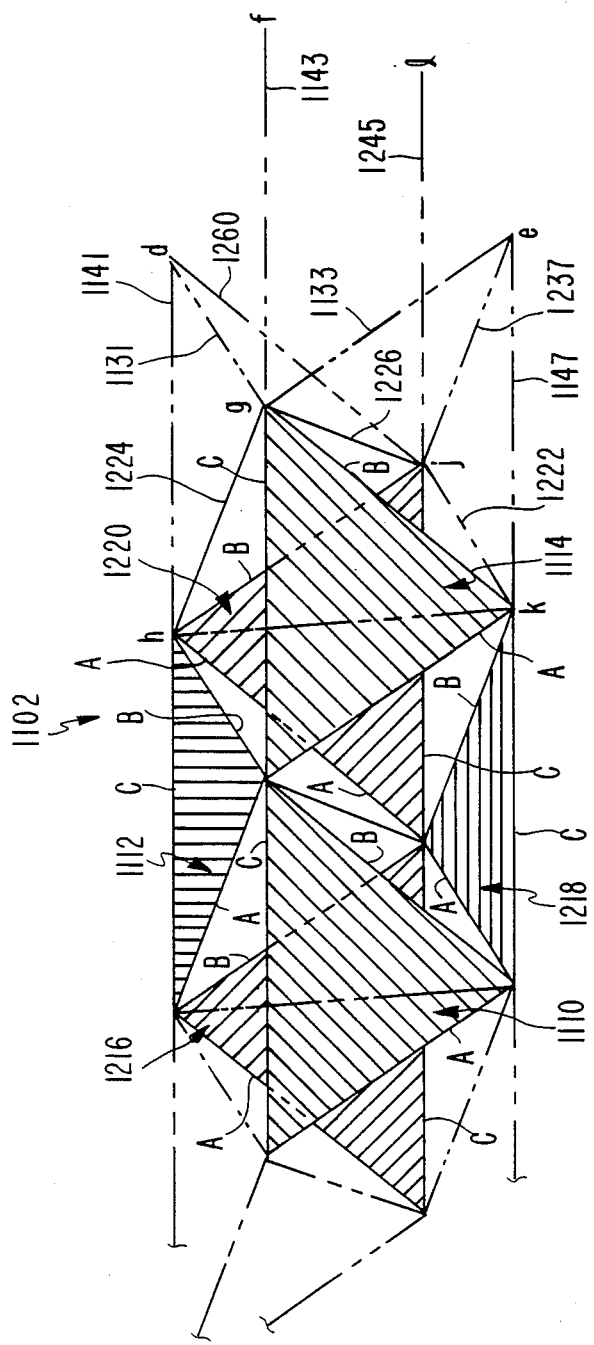
Figure 13B:
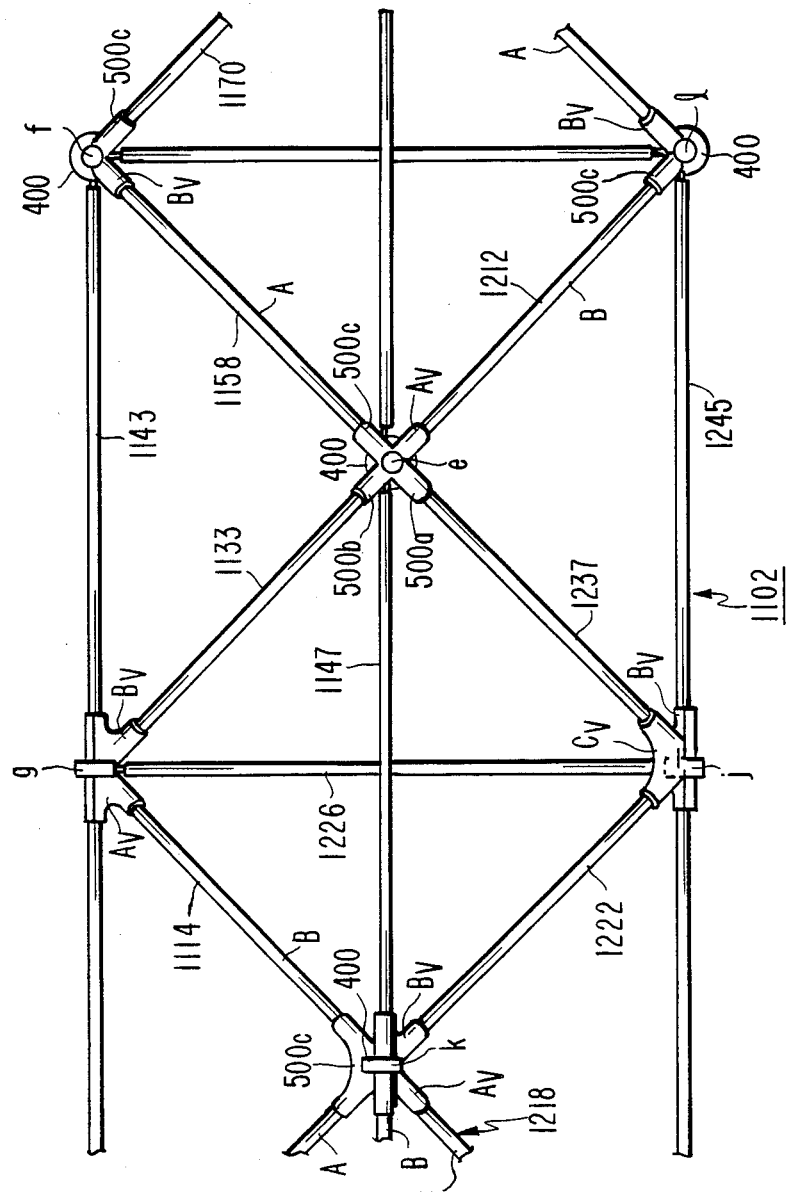
Figure 14:
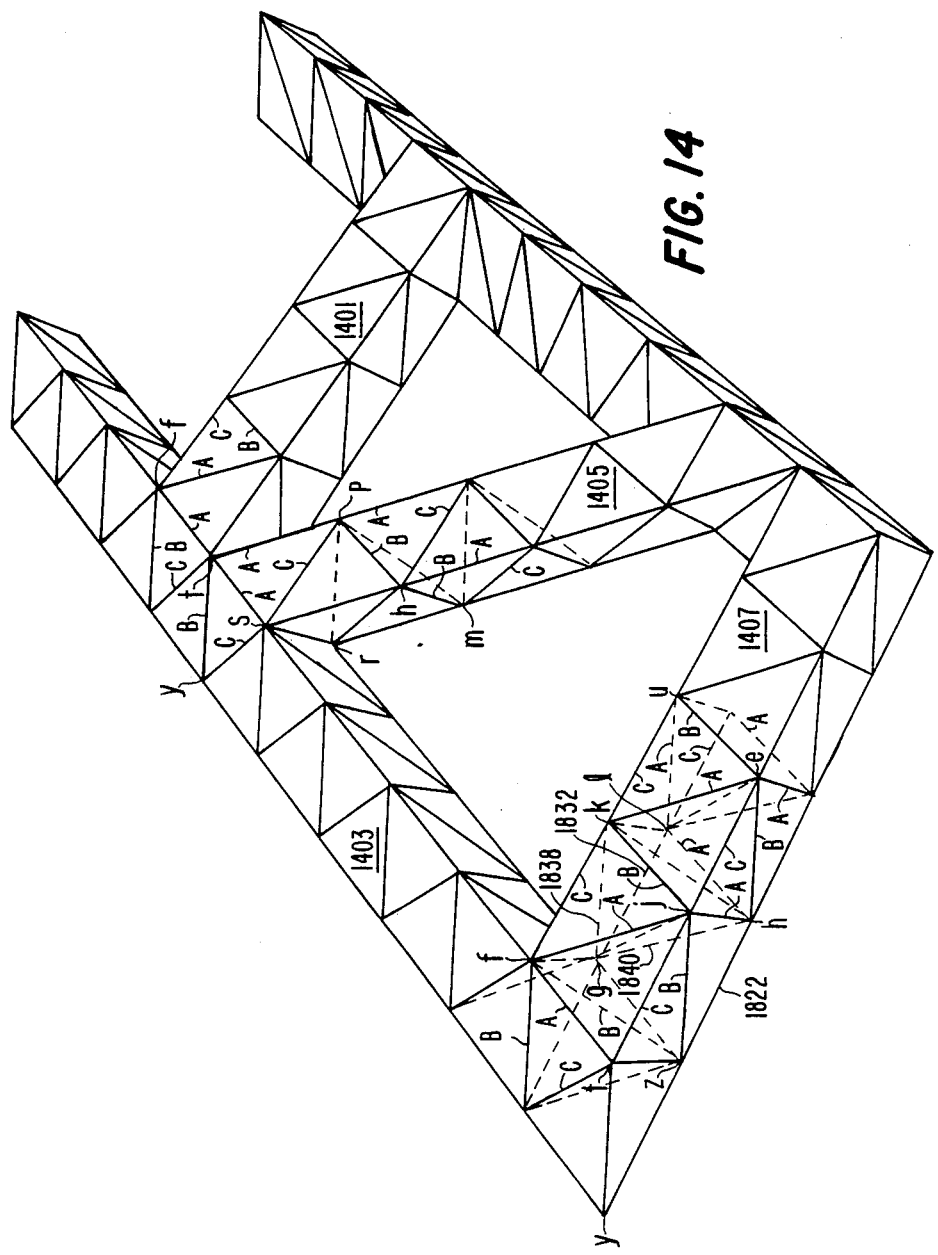
Figure 15:
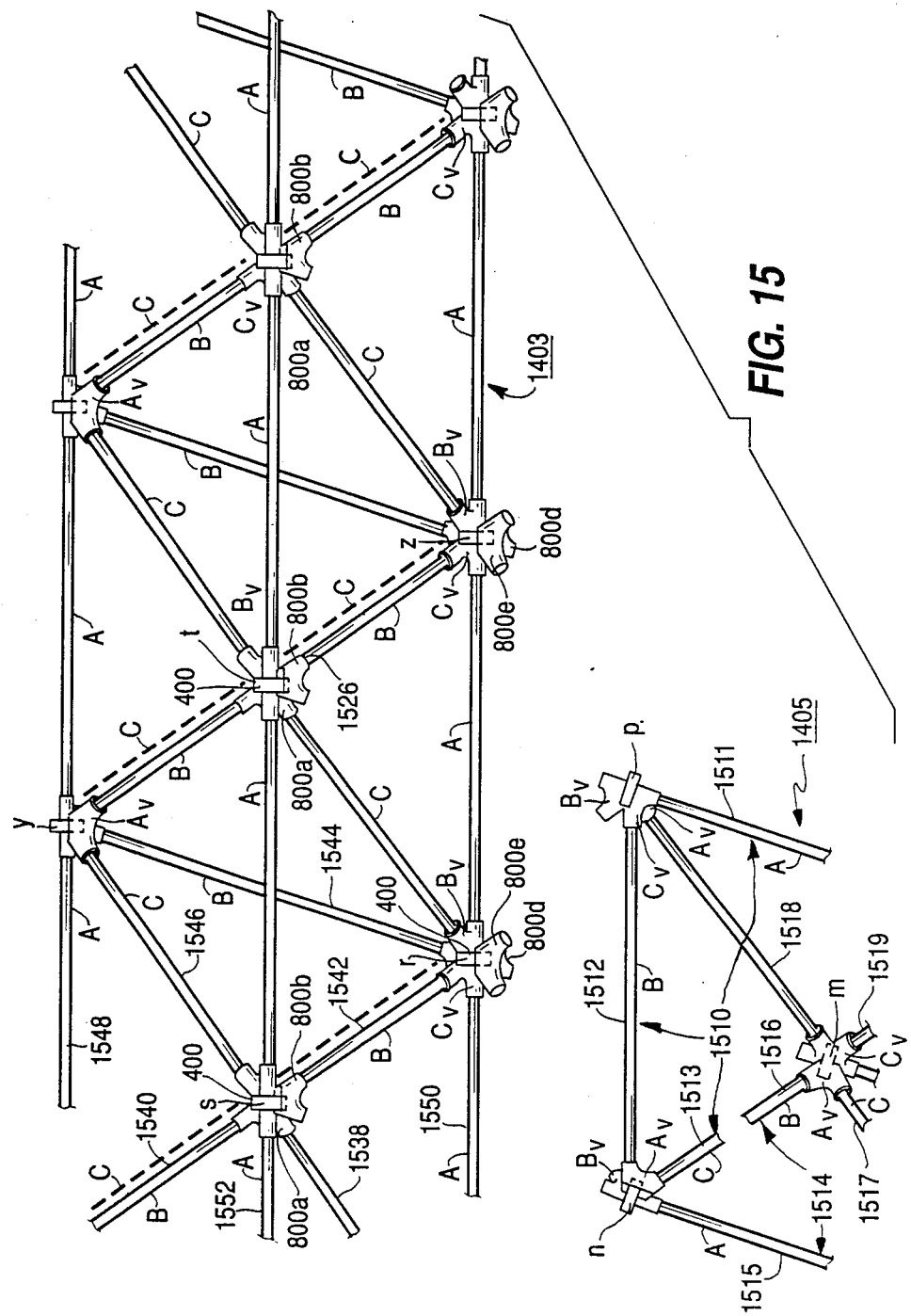
Figure 16:
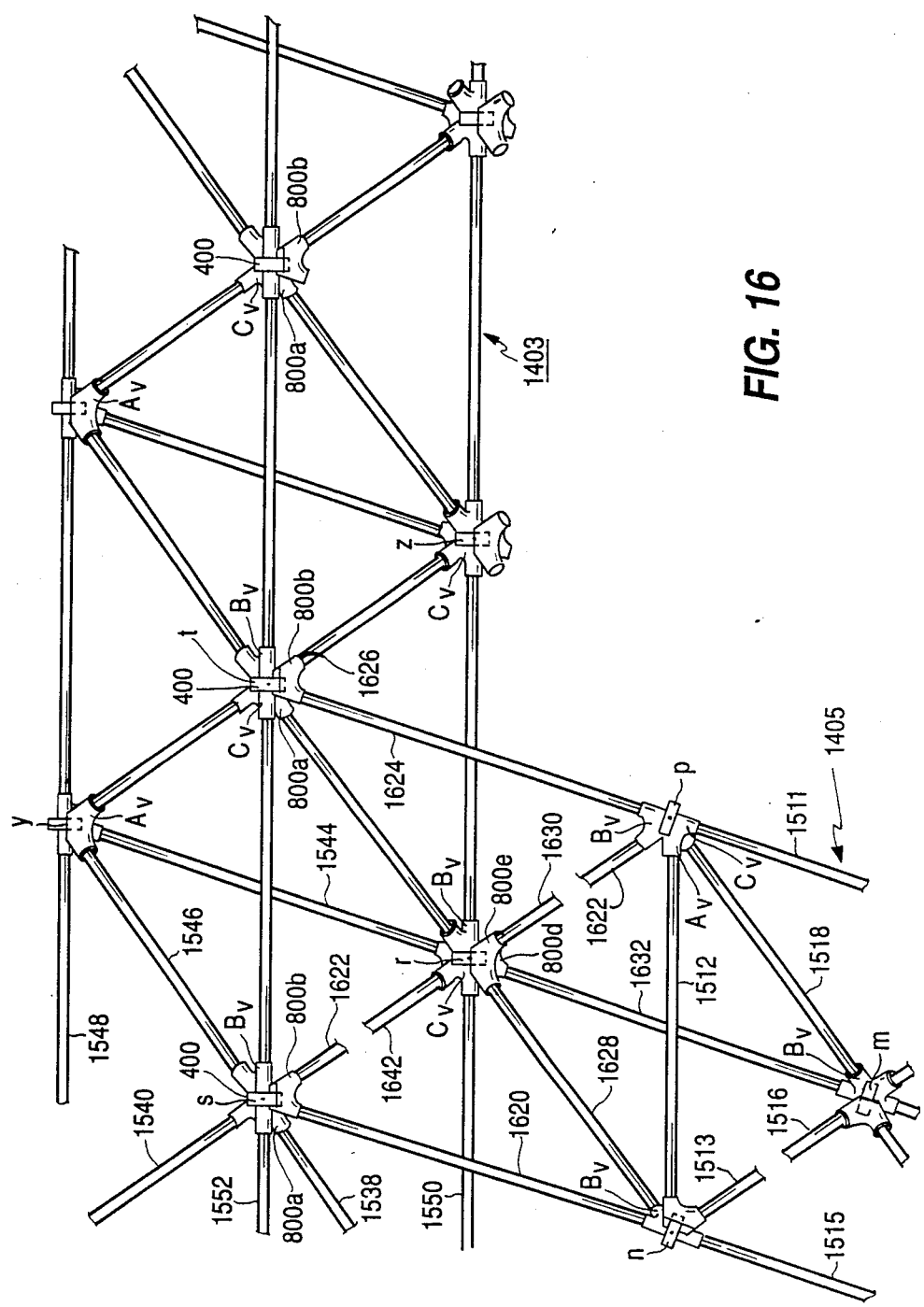
Figure 17:
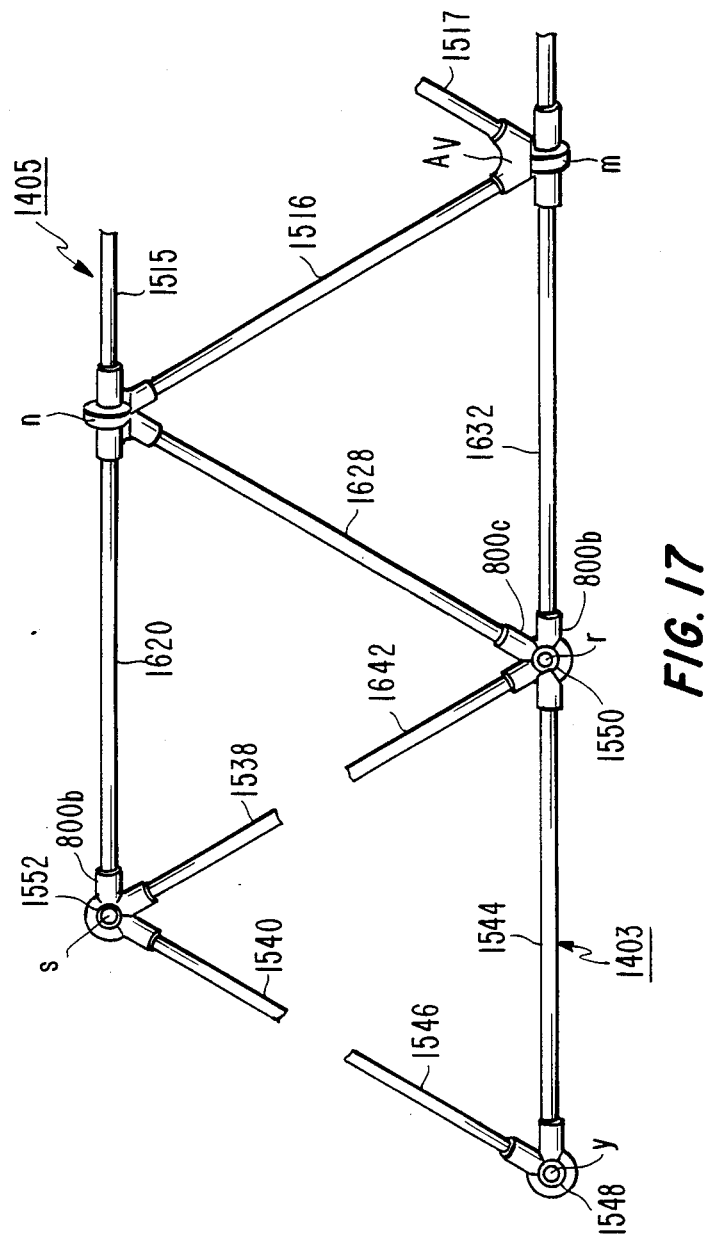
Figure 18:
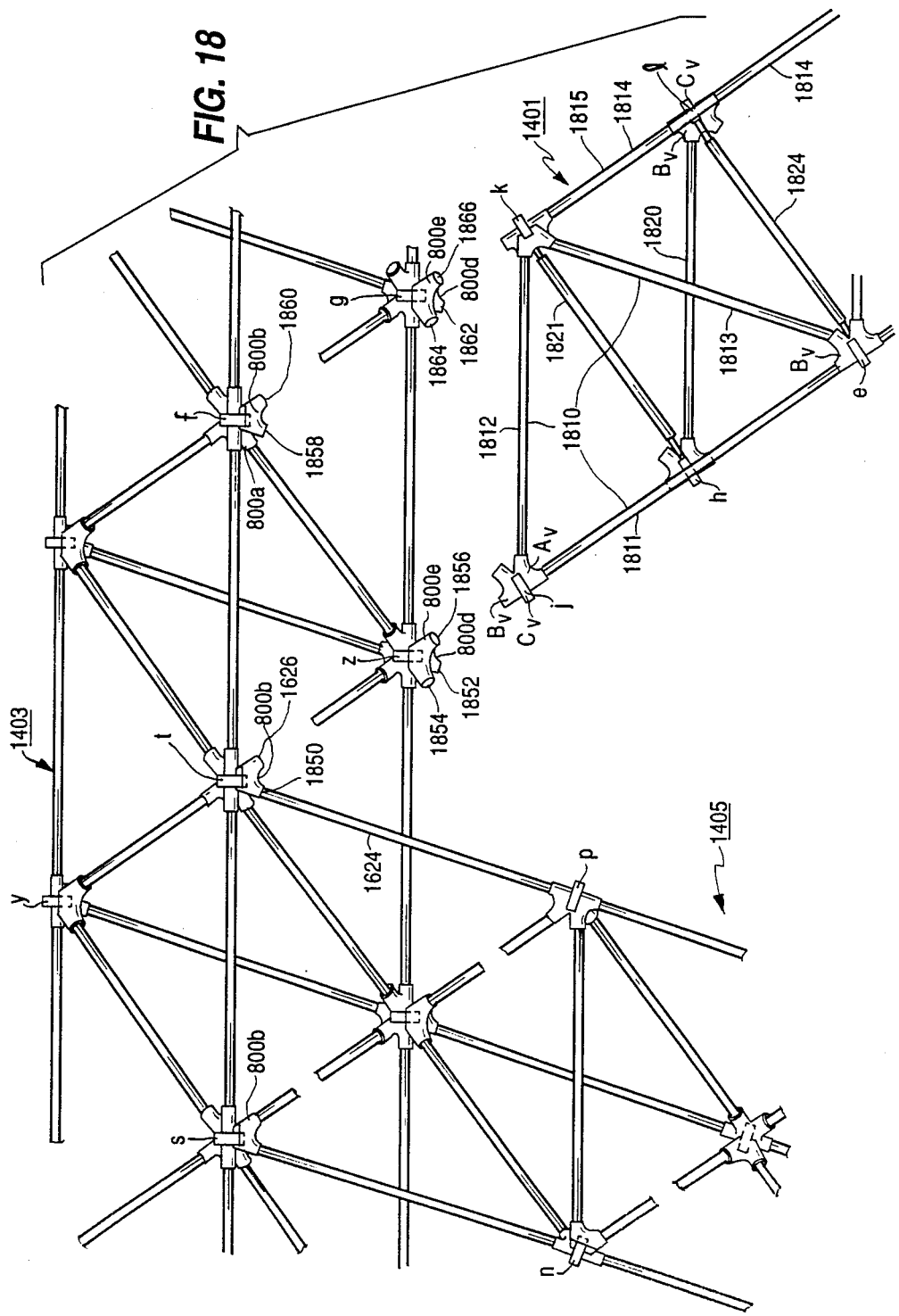
Figure 19:
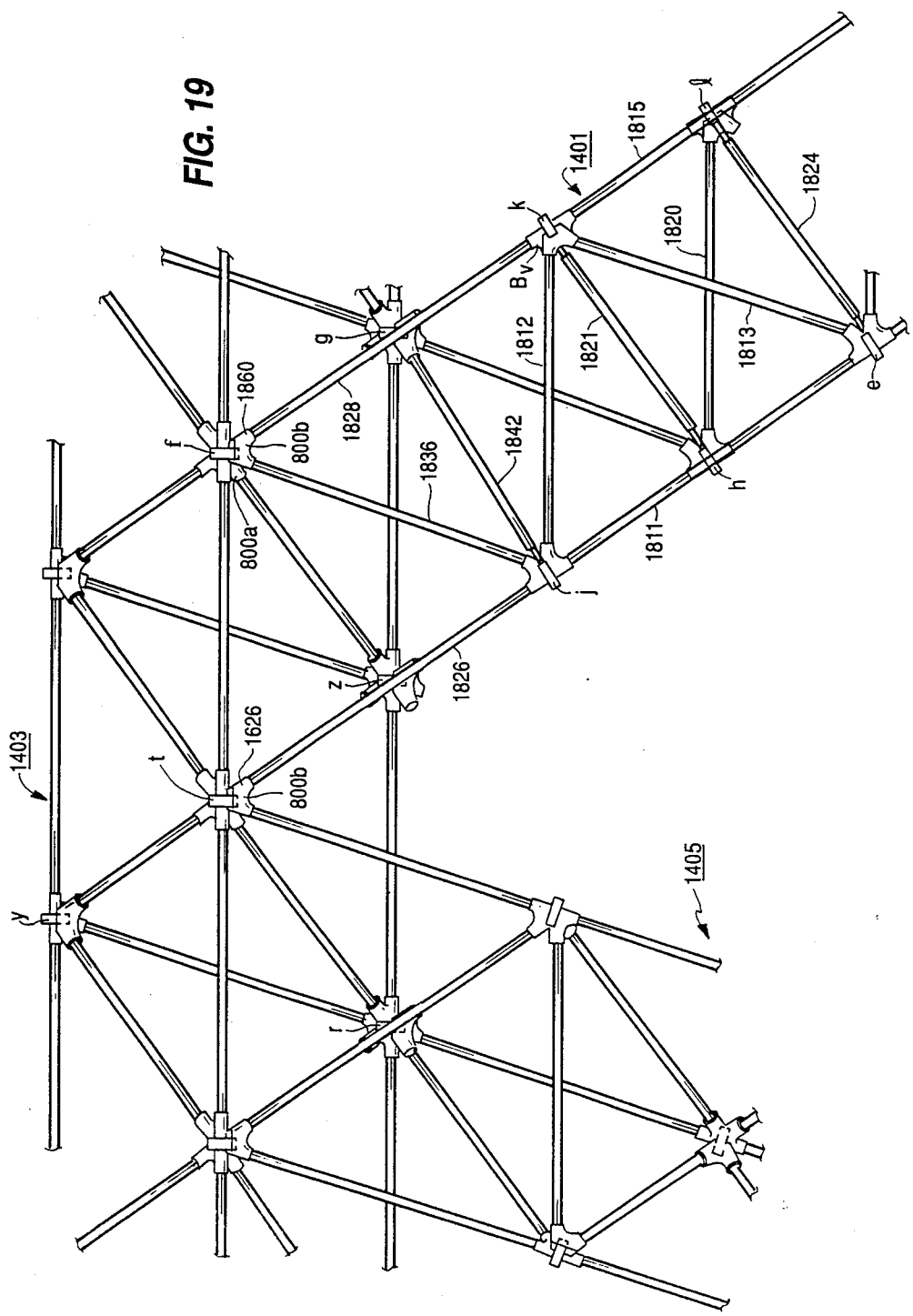
Figure 20:
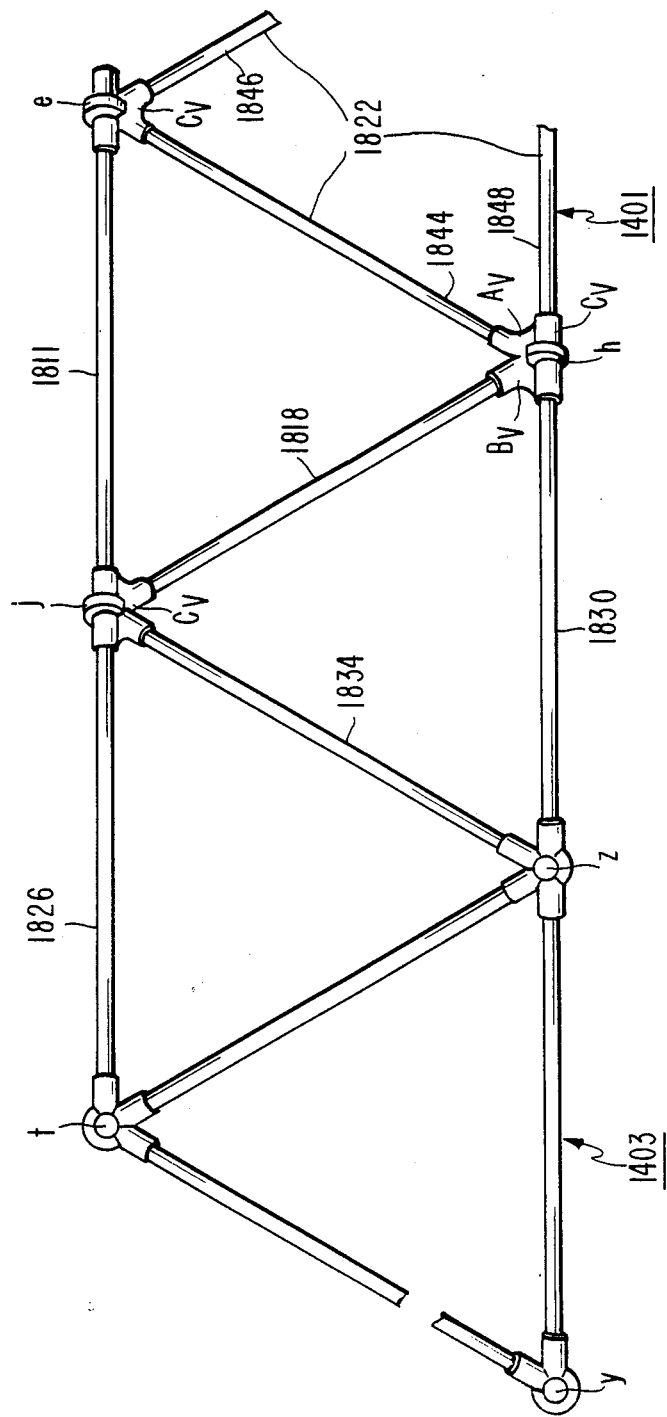

FIGS. 4a, 4b and 4c illustrate first, second and third embodiments, respectively, of a connector member in accordance with the present invention;

FIG. 5 illustrates a square rabbet member;

FIG. 6 illustrates an attachment device formed by attaching a connector member to a square rabbet member;

FIG. 7 illustrates the interconnection of a plurality of square rabbet members and vertex fittings to a single connector member;

FIG. 8 illustrates a triangular rabbet member;

FIG. 9 illustrates an attachment device formed by attaching a connector member to a triangular member;

FIG. 10 illustrates the interconnection of a plurality of triangular rabbet members and vertex fittings to a single connector member;

FIG. 11 schematically illustrates the interconnection of square beams by means of connective apparatus in accordance with the present invention;

FIG. 12 schematically illustrates an exemplary termination of a square beam;

FIGS. 13a and 13b are plan and elevation views, respectively, of the interconnection of the end of a square beam with the side of another square beam;

FIG. 14 schematically illustrates the interconnection of triangular and square beams, as well as the interconnection of two triangular beams by means of connective apparatus in accordance with the present invention; and FIG. 15 illustrates, in plan view, one end of a T-beam in place for attachment to the side of another T-beam;

FIG. 16 illustrates, in plan view, the attached condition of the two beams illustrated in FIG. 15;

FIG. 17 illustrates, in elevation view, the portion of FIG. 16 along certain nodes illustrated in FIG. 17;

FIG. 18 illustrates, in plan view, one end of a S-beam in place for attachment to a T-beam;

FIG. 19 illustrates, in plan view, the attached condition of the two beams, illustrated in FIG. 18; and FIG. 20 illustrates, in elevation view, the portion of FIG. 19 along certain nodes illustrated in FIG. 20.

DETAILED DESCRIPTION OF THE INVENTION

With reference now to the drawings, FIG. 1a illustrates a known triangular truss beam frame element (T-frame) 1-4 of the type used in the construction of a triangular truss beam (T-beam) 1-6, shown in FIG. 1b. T-beam 1-6 includes a plurality of nodes such as 1-10. FIG. 1c illustrates an exploded view of a typical T-beam node.

Figure 2B:
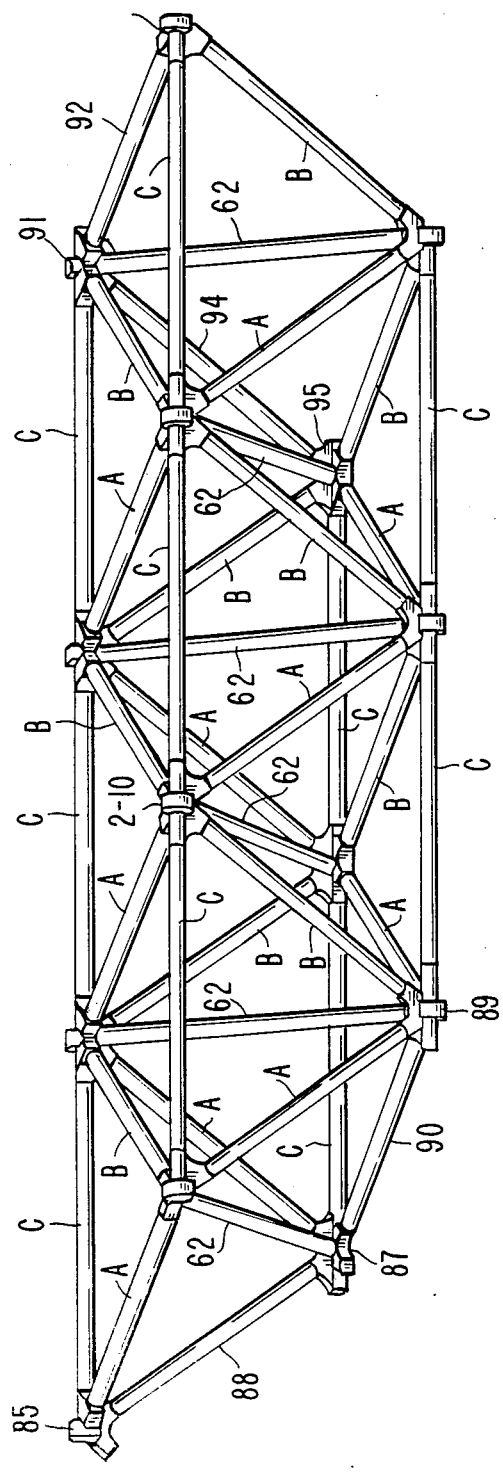

Similarly, FIG. 2a depicts a square truss beam frame element (S-frame) 2-4 of the type used in the construction of a square truss beam (S-beam) 2-6 shown in FIG. 2b. S-beam 2-6 includes a plurality of nodes such as 2-10. FIG. 2c shows an exploded view of a typical S-beam node.

As shown in FIG. 1a, a T-frame 1-4 is constructed of three struts, designated, respectively, A, B, and C, interconnected by first, second and third vertex fittings, respectively designated $A_v$, $B_v$, and $C_v$, disposed at first, second, and third vertices respectively of the frame element. An S-frame 2-4 as shown in FIG. 2a is constructed of three struts, designated A, B, and C, interconnected by first, second, and third vertex fittings, respectively designated $C_v$, $A_v$, and $B_v$, disposed at first, second, and third vertices respectively of the frame element. The designation of each fitting of each type of frame element corresponds to the designation of the oppositely positioned strut. For example, the $C_v$ vertex fitting lies opposite the C strut in both FIGS. 1a and 2a. FIGS. 1b and 2b respectively display T- and S-beams constructed from T- and S-frames. Each longitudinal edge of a T-beam is composed of a succession of A struts, e.g. 2A, 5A, 8A, as shown in FIG. 1b or alternatively of B struts (not shown). By contrast, in a square beam as shown in FIG. 2b, the longitudinal edge is formed only of C struts. In both FIGS. 1a and 2a, A and B struts are of equal length and the C strut is longer than the A and B struts. A preferred relation is:

$$C = 2/\sqrt{3} \cdot A \text{ or } B$$

It will be understood that the T-beam 1–6 shown in FIG. 1b may have any desired length depending on the number of T-frames used. The specific beam shown in the drawing is constructed by interconnecting nine T-frames 1–4, FIG. 1a), designated by Roman numerals I to IX, at a plurality of nodes. Each strut of each T-frame is designated by an Arabic numeral corresponding to the Roman numeral of the particular frame element, followed by a letter indicating that it is an A, B, or C strut. Three end struts, 20, 22, and 24, are used to "close" off the beam at opposite ends so that each complete T-frame is attached at all three vertices.

FIG. 1c illustrates an exploded T-beam node, such as node I-10 of FIG. 1b. Tab 11 of fitting $A_v$ includes an aperture 26, shown by phantom lines, through which an elongate pin 28, attached to vertex fitting $C_v$, passes to mate with a bore 30, shown by phantom lines, of vertex fitting $B_v$, all of them aligned along a common axis 32. Pin 28 may be retained within bore 30 by a lockscrew or similar means, not shown. By successively connecting individual T-frames 1–4 to each other at nodes such as that depicted in FIG. 1c and also connecting the aforementioned end struts 20, 22 and 24, the T-beam illustrated in FIG. 1b is constructed.

The length of S-beam 2–6 shown in FIG. 2b is likewise determined by the number of S-frames (2–4, FIG. 2a) used, ten being employed in the illustrated example. Each strut of the S-frame is designated by a letter, depending on whether it is an A, B, or C strut. The S-beam shown further includes a plurality of support struts 62 to provide internal bracing for the beam. In addition, each end of the S-beam is "closed" in the general manner of a T-beam, by attaching thereto a pair of end struts 88, 90 and 92, 94 respectively. Thus, strut 88 is attached at its opposite ends to nodes 85 and 87. Strut 90 is attached at its opposite ends to nodes 87 and 89. Similarly, struts 92 and 94 are attached to nodes 91, 93 and 91, 95 respectively.

An S-beam node, such as node 2-10 of FIG. 2b, is depicted in exploded view in FIG. 2c. Similarly to the T-beam node of FIG. 1c, an elongate pin 36 attached to vertex fitting $B_v$ passes through an aperture 38, illustrated in phantom, of a tab 40 of vertex fitting $C_v$ and mates with a bore 42 in vertex fitting $A_v$, all aligned along a common axis 44. This union may be fixed by use of a lockscrew, not shown, inserted into a threaded lockscrew hole 46 in vertex fitting $A_v$. Surface 48 of vertex fitting $C_v$ is of a curvilinear shape to clear curved surface 50 of vertex fitting $A_v$. Although not illustrated in FIG. 2, vertex fitting $C_v$ is also of shape to clear curved surface 52 of vertex fitting $B_v$ curvilinear.

FIG. 3a, to which attention is now directed, illustrates in detail one exemplary embodiment of how a strut such as C in FIG. 2a can be connected to vertex fitting $A_v$ and/or vertex fitting $B_v$, for example. The connection can be made even though vertexes $A_v$ and $B_v$ are rigidly positioned relative to one another by struts A and B and vertex $C_v$.

In FIG. 3a it is desired to attach a first member 300, indicated by bracket 302, to a second member 304, indicated by a bracket 306. Member 300 is shown both in cross-section and broken away and as exemplified by a strut such as C in FIG. 2a, for example. Member 304 is also shown in cross-section and broken away and as exemplified by a vertex such as $A_v$ in FIG. 2a.

Member 300 includes an axial shaft bore 308 which is alignable with a bore 310 of substantially the same diameter in receiving member 304. A connector pin 312, typically of cylindrical shape, which has a first aperture 314, a free pin end 318 and a distal pin end 320, slidably engages bore 308 and is shown with free pin end 318 flush with end 300a of member 300.

A compression spring 322 is positioned between, the closed end 324 of bore 308 and pin end 320, urging end 318 of pin 312 into bore 310 of member 304. During assembly, however, pin 312 is held in the position shown in FIG. 3a by a pin passing through aperture 316 and through two coaxially extending apertures in member 300, all as best seen in FIG. 3c. FIG. 3c is a cross-section taken along lines 3c—3c in FIG. 3a.

In FIG. 3c member 300 is shown to include an aperture 330 consisting of portions 330a and 330b which are in line with one another and in line with aperture 316 in pin 312 when the pin is in the position relative to member 300 as illustrated in FIG. 3a. A dowel pin 332 positioned through apertures 316 and 330 keeps pin 312 positioned as shown in FIG. 3a.

Figures 3B, 3D:
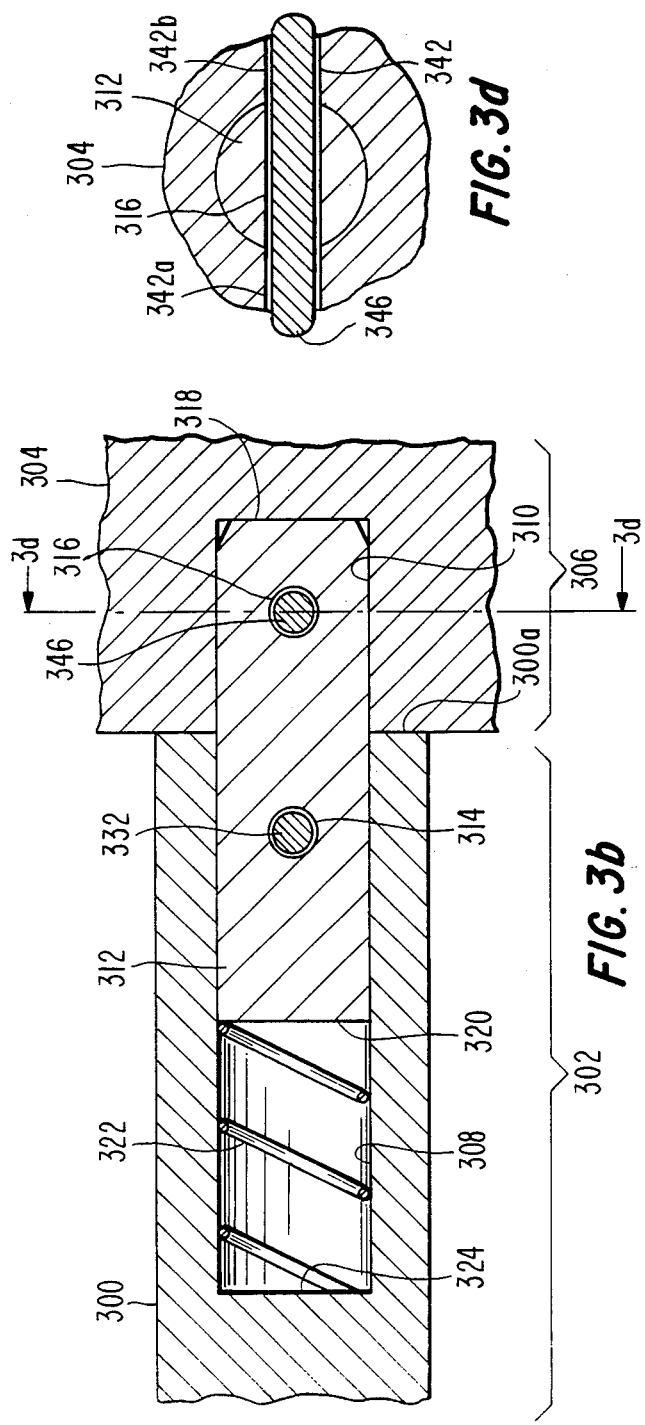

Returning to FIG. 3a, when it is desired to attach member 300 to member 304, bore 308 in member 300 is lined up with bore 310 in member 304 and dowel pin 332 (FIG. 3c) is pulled. Thereupon the energy stored in spring 322 forces pin 312 into bore 310 until end 318 of pin 312 strikes end 340 in member 304 as illustrated in FIG. 3b. Pin 312 is tapered at end 318 to correct any slight misalignment of the pin with bore 310. Member 304 includes an aperture 342 positioned in the member at a position such that when end 318 of pin 312 is touching end 340 of bore 310 in member 304 is aligned with aperture 316 in pin 312. Similarly, aperture 314 is positioned relative to aperture 316 such that when pin 312 is positioned as shown in FIG. 3b aperture 314 is in line with apertures 330 (FIG. 3c) in member 300 while aperture 316 is in line with aperture 342. See FIG. 3a and FIG. 3d which is a cross-section along lines 3d—3d of FIG. 3b. With pin 312 positioned as illustrated in FIG. 3b, when dowel pin 332 is positioned through aperture 330 in member 300 and aperture 314 in pin 312 and when a pin 346 is positioned in aperture 342 in member 304 and aperture 316 in pin 312, member 300 is secured to member 304.

FIG. 4a illustrates in perspective one preferred embodiment of a curvilinear connector member 100 designated 400a (to distinguish it from a similar member 400b to be hereinafter described) in accordance with the present invention. As shown, connector member 400a is configured as a disk having a continuous, peripheral side surface 430 extending between parallel top and bottom surfaces 420, 422. The thickness dimension of member 400a is measured between surfaces 420 and 422. The present invention is not limited to such a configuration, however. Thus, connector member 400 could, for example, be polygonal in shape, typically in the form of a regular hexagon (as shown at 400b in FIG. 4b which has six sides each legended 430), for the T-beam and an octagon for the S-beam. If a polygonal rather than a circular configuration is selected, the number of sides chosen will depend upon the number of connections to be made thereto and the desired angles between the connections, as will be described hereinafter.

All illustrated versions of connector member 400 (400a, 400b and 400c in FIGS. 4a, 4b and 4c, respectively) have a centrally positioned through hole 440 illustrated mostly in phantom for receiving an elongate pin, such as pin 28 of FIG. 1c or pin 36 of FIG. 2c. As shown in FIG. 4a, each of a plurality of bore holes 450 extends in a radial direction toward the center of through hole 440. In FIG. 4a, only three bore holes are shown for the sake of clarity. In a practical embodiment as will be more fully explained hereinafter, a more typical number of holes would be six or eight at a uniform radial spacing. Further, for reasons to be disclosed hereinafter, each bore hole 450 may be advantageously threaded.

FIG. 5 illustrates in perspective what will be termed a square rabbet member or S-rabbet member 500 for use in an S-beam in accordance with the present invention. S-rabbet member 500 preferably has substantially parallel top and bottom surfaces 510 and 512, respectively, and a plurality of planar side surfaces including 514, 516, 518 and 520 extending therebetween. A curved surface 522 extends from surface 514 to surface 516 between top and bottom surfaces 510 and 512. Matching curvilinear side surface 524 of rabbet member 500 comprising an upper portion 524b and a lower portion 524a is concave to conform to the shape of a member, such as curved surface 50 or 52 of vertex fittings A$_v$ or B$_v$, respectively, FIG. 2c. A slot 526 comprising surfaces 528, 530 and 532 is cut into surface 524 for accepting connector member 400 when rabbet member 500 is to be attached thereto. The slot extends between top and bottom surfaces 510 and 512 of rabbet member 500, its width between surfaces 528 and 530 being selected to accept connector member 400 in the thickness dimension of the latter. Slot back surface 532 is preferably configured to provide a close fit with the connector member. In the embodiment of the invention shown in FIG. 5, a right circular aperture 540 with center line 540a extends between surfaces 522 and 532. Aperture 540 accepts a fastener such as a threaded bolt 542, for securing rabbet 500 to connector 400 (FIG. 4a or 4b). In the case of a threaded bolt being used in aperture 540, holes 450 in connector 400 would be threaded. It will be clear that the present invention is not limited to the threaded bolt attaching means shown.

For example, rabbet member 500 could also be fastened to connector member 400 by welding, or by otherwise rigidly joining the two components together to form a unitary attachment device.

Side surfaces 514 and 516, which face generally in a direction opposite to side surface 524, are each capable of attachment to individual struts (such as 2-4 in FIG. 2a) by virtue of connecting holes 534 and 536 respectively in these surfaces which correspond to bore 310 in member 304, FIG. 3a. Each connecting hole may be threaded to receive the threaded end of a strut attached to rabbet member 500. It will be understood that the present invention is not limited to the use of a threaded hole as the attaching means. Thus, any suitable means may be used for this purpose, e.g., the apparatus depicted in FIGS. 3a to 3d described previously where member 304 corresponds to rabbet 500 with bore hole 310 corresponding to hole 534 or hole 536. It will be realized that with the apparatus of FIGS. 3a-3d, through holes are needed extending between surfaces 510 and 512 passing through holes 534 and 536 which are equivalent to hole 342 in member 304 of FIG. 3. Such holes are not shown in FIGS. 5 and elsewhere where rabbets 500 are shown for the sake of drawing clarity.

Side surface 522 is shown in FIG. 5 to have an arcuate configuration. This has the advantage of reducing the mass of rabbet member 500, an important consideration particularly for non-terrestrial uses. Here again, however, the invention is not limited to such a configuration and other shapes for side surface 522 may be selected. Similarly, side surfaces 518 and 520, which are shown planar in the drawing, may have other configurations. Rabbet member 500 further has four substantially planar bearing surfaces 550, 552, 554, and 556. Surfaces 550 and 554 lie in the same plane and surfaces 552 and 556 lie in the same plane.

Surfaces 550 and 554 are normal to surfaces 552 and 556. Planes passing along surfaces 550 and 552, respectively (not shown), intersect along line 560 which is also the radial centerline of arcuate surfaces 524 (a and b). In accordance with the present invention, these surfaces are configured to conform to the bearing surfaces of adjoining rabbet members 500 attached to the same connector member 400. For example, as shown in FIG. 7, to be discussed in detail hereinafter, bearing surfaces 550 (hidden) and 554 of rabbet member 500a abut bearing surfaces 552 (hidden) and 556, respectively of rabbet member 500b. Thus, rabbet 500 is generally symmetrical about a plane (not shown) passing through the center line of aperture 540 and perpendicular to surfaces 512 and 514.

When rabbet member 500 and connector member 400 are attached to each other they form an S-attachment device 600, as shown in FIG. 6. It will be understood from the foregoing discussion, that attachment device 600 performs a function which is in certain ways similar to that of vertex fitting A$_v$ of FIG. 1a, or of vertex fitting C$_v$ of FIG. 2a. Thus, attachment device 600 may be positioned at a vertex of a frame element in lieu of the vertex fitting positioned there in accordance with the teachings of the patent application associated with FIGS. 2 (a, b, or c). In that position connector member 400 functions in similar manner to tabs 11 and 40 in FIGS. 1c and 2c respectively, i.e., to form a node, while rabbet member 500 functions to form the attachment to the struts of the proper frame element. This is similar to the structure shown in FIG. 7 where frame strut A and frame strut B are shown in phantom outline attached to rabbet member 500a. However, unlike the aforesaid tab and vertex fittings, S-attachment device 600, and specifically connector member 400 thereof, permit other objects or devices to be attached thereto, e.g., a plurality of rabbet members 500, as shown by the cluster of three rabbet members 500a, 500b, and 500c illustrated in FIG. 7.

The separable nature of attachment device 600 into a connector member and a rabbet member has the further advantage of reducing storage space aboard a spacecraft whenever the connector member diameter is greater than the strut diameter. As can be readily seen from FIG. 7, connector member 400 has a diameter greater than that of a frame strut such as 2-4 in FIG. 2b. Thus, when individual frame elements are stacked one upon the other in a launch vehicle, the larger diameter of the connector members 400 on the frame elements will cause the stacks to use more space than otherwise would be necessary. By attaching only the rabbet member 500 to the struts such as A or B of the frame elements and deferring the attachment of connector member 400 to rabbet member 500 until the frame elements are ready to be assembled into a truss beam, the individual frame elements can be readily and neatly stacked upon one another in a space launch vehicle. Where stowage space aboard a spacecraft is not a concern, or where the frame elements themselves will be constructed in space, connector member 400 and rabbet member 500 may be integral in accordance with the present invention.

The separable feature of the attachment device 600 has the additional advantage of lowering machining cost over that of the integral configuration whenever the connector member diameter is larger than the rabbet thickness.

Connector member 400 is dimensioned to accept the attachment of a plurality of rabbet members around its periphery. The apparatus depicted in FIG. 7 comprises three S-rabbet members 500a, 500b, and 500c attached to a cylindrical connector member 400 around its periphery. As shown in FIGS. 6 and 7, slots 526 (FIG. 5) of each rabbet member fit onto connector member 400. The two elements are affixed to each other either by means of threaded bolt 542, such as that shown in FIG. 5, or by other known techniques. As discussed above in connection with FIG. 6, the peripheral side surface 430 of connector member 400 makes contact with slot back surface 532 of rabbet 500, the latter surface being preferably configured to conform to connector side surface 430. Top and bottom surfaces 420 and 422 of the connector member lie adjacent to slot top and bottom surfaces 530 and 528 (not visible in FIG. 6) respectively, the thickness of the connector member having been chosen for a close fit in slot 526.

As previously explained, rabbet side surfaces 514 and 516 include connecting holes 534 and 536 respectively which permit a pair of struts to be attached to the rabbet member. Thus, as many as six struts may be attached to the three rabbet members shown in FIG. 7. Up to four additional struts may be joined directly to connector member 400, if desired, using connecting holes 450 located between adjacent rabbet members. For the sake of illustration, two struts 702 and 704 are shown in phantom outline attached to connector member 400. Two additional struts could be attached to two additional holes 450 located between rabbets 500a and 500b and between 500b and 500c, respectively. Vertex fittings 50 and 52 are illustrated apart in FIG. 7. They are ready to be pushed together such that pin 36 will extend through hole 440 into hole 42 (shown in FIG. 2c). The shape of vertex fitting B$_v$ causes it to mate with surfaces 552 and 524b in rabbet 500a, surface 524b in rabbet 500b and surfaces 524b and 550 in rabbet 500c. Similar remarks apply to fitting A$_v$.

In short, one or more nodes of a truss beam may each incorporate an attachment device in lieu of one of the vertex fittings normally forming part of the node. Each such attachment device may carry additional rabbet members which, in turn, may each be connected to one or two struts or to other objects. Furthermore, struts or objects may be connected directly to the connector member. As a consequence, multiple objects may be connected to the truss beam under consideration, and such objects may either take the form of additional truss beams or of other devices, as will be hereinafter illustrated and described.

FIG. 8 depicts a triangular rabbet member 800 (T-rabbet member), so designated because it finds use with a T-beam. Rabbet member 800 is configured similar to S-rabbet member 500 depicted in FIG. 5 and corresponding parts are designated with reference numerals that differ only in the hundreds digit. T-rabbet member 800 includes an off-center slot 826, configured to accept the thickness dimension of connector member 400. In particular, rabbet 800 is not symmetrical about a plane (not shown) passing along center line 840a and normal to parallel planar surfaces 812 and 814. Thus, for example, angle a < angle A. Further, a plane (not shown) passing along surfaces 852 and 856 intersects a plane (not shown) passing along surfaces 850 and 854 at a 60° angle, the vertex of which is along line 860. Thus, the dimensions of some of the side surfaces and of the bearing surfaces are seen to differ from the corresponding surfaces of the S-rabbet member in order that more T-rabbet members may be clustered around connector member 400.

FIG. 9 shows an attachment device 900 comprising a T-rabbet member 800 attached to a connector member 400 and is the counterpart of the attachment device 600 illustrated in FIG. 6. Like the equivalent device shown in FIG. 6, the present attachment device may be located at a vertex of a frame element in lieu of the vertex fitting A$_v$, FIG. 1c, normally positioned there. All of the previous advantages discussed in relation to attachment device 600 and the structure for attaching rabbet member 500 to connector member 400 in FIG. 6 are applicable here.

FIG. 10 shows an isometric exploded view of apparatus wherein a plurality, five, of T-rabbet members 800 and two vertex fittings are attached to connector member 400. As shown in FIG. 10, the position of slot 826 alternates as respective rabbet members 800a to 800e are attached around the periphery of the connector member. This alternating orientation around the periphery of connector member 400 is determined by the geometry of a T-beam.

The attachment apparatus described and shown in FIGS. 4–10 may be used to attach truss beams of the types shown in FIGS. 1b and 2b to one another to form a larger multi-dimensional structure.

Procedure for Attachment of One S-Beam to Another S-Beam

FIG. 11 depicts, in mechanical schematic form, an exemplary structure consisting of a pair of horizontal S-beams 1102 and 1104 attached to a pair of vertical S-beams 1106 and 1108, each of the type illustrated in detail in FIG. 2b. The words "horizontal" and "vertical" are with reference only to the illustrations and have no other significance. Since the connections between each pair of joined beams are substantially identical, they will be described below only with reference to the connection of an end beam 1102 to a side beam 1106. The terms "end" and "side" merely refer to what part of the beam is connected to the other. The letters A, B, and C, used repeatedly throughout FIG. 11, represent struts A, B, and C (see FIG. 2a) comprising a frame element. The letters A, B, and C, which are inside a particular triangle are the letters of the struts for that triangular frame element. In end beam 1102 three frame elements are visible, namely 1110, 1112, and 1114. FIG.

12, to which attention is now directed, illustrates also in mechanical schematic form beam 1102 which is rotated slightly to illustrate additional frame elements relative to those shown in FIG. 11. Again, the letters A, B, and C within a triangle represent the struts of the associated frame element. Thus, in FIG. 12 frame elements 1110, 1112, and 1114 are shown in common with what is shown in FIG. 11 while, in addition, frame elements 1216, 1218, and 1220 are shown, a total of six frame elements in all. Further, it is assumed that S-beam 1102 has a termination as shown in FIG. 12, excluding struts shown dashed which illustrates one of a number of possible terminations of an S-beam. A vertex fitting $C_v$ is positioned at each of nodes g, k, j and h. It will be understood that, while only six S-frames (shown cross-hatched) are illustrated in FIG. 12 for the sake of simplicity, the S-beam shown there may be, within practical limits, of any desired length.

Assuming that the joinder of beams 1102 and 1106 is part of a procedure for constructing a structure in extra-terrestrial space, it is assumed for the present purpose that these beams, once constructed, have been brought into position for attachment to each other. To aid in an understanding of the connection of end beam 1102 to side beam 1106, it will be understood that FIG. 13a is a plan view of a portion of FIG. 11 at the intersection of beams 1102 and 1106 while FIG. 13b is an elevation view of FIG. 11 viewed along strut 1154 toward node e.

As shown in FIG. 12, the right hand end of beam 1102 terminates in a pair of complete S-frames 1114 and 1220, a pair of end struts 1222 and 1224 and a support strut 1226. End strut 1224 connects nodes h and g, as shown in FIGS. 11 and 12. End strut 1222 connects nodes k and j, as shown in FIG. 12. Support strut 1226 connects nodes g and j. None of struts 1222 and 1226, S-frame 1220, and node j, all of which appear in FIG. 12, is visible in FIG. 11.

To effect the attachment of the S-beams 1102 and 1106, which attachment is also shown in FIGS. 13a and 13b, a connector member 400 is available at each of nodes d, e, f, and l, located on beam 1106, all of which are shown in FIG. 12 and all of which, node l excepted, are shown in FIGS. 11 and 13a. At each node the connector member is attached to a rabbet member to form an attachment device (FIG. 6) and is placed there during construction of beam 1106 in lieu of the appropriate vertex fitting $C_v$ (FIG. 2b). Alternatively, all nodes could be manufactured with attachment devices. Thus positioned, the connector member of the attachment device forms a point of attachment between beams, or between a beam and another device.

As previously explained in connection with FIG. 7, such other device attached to the connector member may constitute one or more rabbet members. The specific rabbet members are legended in FIGS. 13a and 13b consistent with their legends in FIG. 7. Two S-rabbet members 500a and 500b of the type shown in FIG. 5 are attached to each of the connector members located at nodes d and e in FIG. 11 in addition to the rabbet member 500c which is part of the attachment device. As shown in FIG. 5, each rabbet member has two surfaces, 514 and 516, to which one end of a strut may be attached. The four newly attached rabbet members thus provide eight possible strut attachment surfaces, four of which are utilized to connect beams 1102 and 1106 to each other. The unused attachment surfaces remain available for making connections to other beams or objects.

To complete the connection between end beam 1102 and side beam 1106 strut 1141 is connected between vertex fitting $B_v$ at node h and connector 400 at node d (FIG. 13a); strut 1147 is connected between vertex fitting $B_v$ at node k and connector 400 at node e (FIG. 13a); strut 1131 is connected between vertex fitting $C_v$ at node g and one end of rabbet 500b at node d (FIG. 13a) (note there is no other strut attached to that rabbet member); strut 1133 is connected between vertex fitting $B_v$ and node g and one end of rabbet member 500b at node e (FIG. 13a). There is no connection to the other end of rabbet member 500b at node e.

Further, to complete the connection of end beam 1102 to side beam 1106, strut 1237 is connected between vertex fitting $C_v$ at node j and rabbet member 500a at node e (FIG. 13b) (there is no connection to the other end of rabbet member 500a at node e); strut 1260 (FIG. 12) is connected between vertex fitting $B_v$ at node j (FIG. 13b) and one end of rabbet 500a at node d (not visible in any figure, but directly behind vertex fitting 500a at node e in FIG. 13a); strut 1143 (FIGS. 13a and 13b) is connected between vertex fitting $B_v$ at node g and connector 400 at node f and, finally, strut 1245 is connected between vertex fitting $B_v$ at node j and connector member 400 at node l. In this manner, the two beams 1102 and 1106 are securely fastened together.

FIG. 14 illustrates, in schematic form, an example of a more complex structure, relative to that illustrated in FIG. 11, that may be constructed by the use of the present invention. FIG. 14 depicts an end face-to-side face attachment between an S-beam 1401 (FIG. 2b) and a T-beam 1403 (FIG. 1b). Also shown is a connection between the end face of a T-beam 1405 and the side face of T-beam 1403. FIG. 14 further illustrates how a plurality of beams may be interconnected at a single node. Thus, at node t beams 1401, 1403, and 1405 are all interconnected. These attachments are substantially similar to the attachment of the two S-beams shown in FIG. 11, but they may differ on the use of T-rabbet members in place of S-rabbet members and T attachment devices in place of attachment devices.

Procedure for Attachment of One T-Beam to Another T-Beam

In the procedure for attaching end T-beam 1405 to side T-beam 1403 (as with FIG. 11 "end" and "side" merely refer to that part of the beam to which attachment is desired). It is assumed for present purposes that, once constructed, beam 1405 is brought into position for attachment to beam 1403, such as shown in FIG. 15. In FIG. 15, beam 1503 has been rotated somewhat relative to the position shown in FIG. 14 such that attachment interface nodes r, s, and t shown in FIG. 14 are positioned as shown in FIG. 15.

The terminal end of beam 1405 that is to be connected to beam 1403 consists of two complete T-frames 1510 and 1514 and a C-end strut 1518. Frame 1510 comprises struts 1511(A), 1512(B), 1513(C) where the letters in parentheses identify the type strut in the frames. The connection between struts 1511 and 1513 at a vertex fitting $B_v$ is not illustrated. Frame 1514 comprises struts 1515(A), 1516(B), and 1517(C). The interconnection of struts 1516 and 1515 is hidden at node n by strut 1513 and vertex fitting $A_v$. Complete sets of vertex fittings are present at each of m, n, and p as follows: node m contains vertex fitting $A_v$, or more particularly, the attachment device replacement therefore as illustrated in FIG. 9, from frame 1414, vertex fitting $B_v$ from end strut 1518 and vertex fitting $C_v$ from frame 1519; node n contains vertex fitting $A_v$, or more particularly, the attachment device replacement therefore as illustrated in FIG. 9, from frame 1510, vertex fitting $C_v$ (largely hidden) from frame 1514; and $B_v$ which is attached to lock to vertex fitting $C_v$ at node n; node p contains vertex fitting $A_v$ (largely hidden), or more particularly, the attachment device replacement therefore as illustrated in FIG. 9, from end strut 1518, vertex fitting $B_v$ which has been added to lock the joint, and $C_v$ from frame 1510. There are a total of six sites for connecting struts to these fittings, one on vertex fitting $B_v$ of node m, two on vertex fitting $B_v$ of node n, two on vertex fitting $B_v$ and one on vertex fitting $A_v$ (hidden by node $C_v$) of node p.

Attachment of beam 1405 to beam 1403 is accomplished as follows, with reference to FIGS. 15, 16 and 17. FIG. 16 is identical to FIG. 15 except with struts mentioned below already in place. FIG. 17 shows an elevation view of FIG. 16, with the view parallel to the long axis of beam 1403 and facing toward the right. Thus, beam 1403 is shown directly on end, with its cross-section bounded by nodes r, s, and y. The attached beam 1405 extends toward the right. A total of four rabbet fittings 800 are attached to T-connector members 400 located at nodes r, s, and t on beam 1403, specifically one, 800b, each at points s and t and two, 800d and 800e, at point r. The letters b, d, and e are related to those letters in FIG. 10. The four fittings 800 provide attachment sites for a total of eight struts, of which six are utilized for connecting the two beams 1403 and 1405 together.

The assembly of beams 1403 and 1405 will be best understood with reference to FIG. 16. The fittings 800b at nodes s and t lie in the plane passing through nodes npst, fitting 800b at node s providing for attachment of struts between nodes s and n namely strut 1620 (FIG. 16), and nodes s and p (strut 1622); and fitting 800b at node t providing for attachment of a strut between nodes t and p, namely strut 1624 of FIG. 16. The latter fitting therefore has an available connection site 1626 which can be used for an additional strut attachment. Of the two fittings 800 at node r, one, 800e, lies in a plane rnp and the other, 800d, in plane rmz. Fitting 800e provides for the attachment of struts 1628 and 1630. Fitting 800d provides for attachment of strut 1632 and hence has an open site (hidden by fitting 800e) available for connecting another strut. The six struts 1620, 1622, 1624, 1628, 1630, and 1632 are attached between the two beams 1403 and 1405. The specific connections are: strut 1620 between fitting 800b at node s and vertex fitting $B_v$ at node n; strut 1622 between fitting 900b at node s and vertex fitting $B_v$ at node p; strut 1624 between the fitting 800b at node t and vertex fitting $B_v$ at node p; strut 1632 between the fitting 800d at node r and vertex fitting $B_v$ at node m; struts 1628 and 1630 between fitting 800e at node r and vertex fitting $B_v$ at node n and vertex fitting $C_v$ (partially hidden by vertex fittings $B_v$ and $A_v$) at node p, respectively. This completes the description of the attachment of the two T-beams 1403 and 1405.

Procedure for Attachment of an S-Beam to a T-Beam

The procedure for attaching an S-beam such as beam 1401 to a T-beam such as 1403 as depicted in FIG. 14 is now described. For greater comprehensiveness, the process of attaching beam 1401 to the assembled configuration of beams 1403 and 1405 shown in FIGS. 16 and 17 so as to form the assemblage of beams 1403, 1405, and 1401 shown in FIG. 14 is considered.

Prior to commencement of the assembly operation, S-beam 1401 is brought into position for attachment such as is shown in FIG. 18. The view presented here is the same as utilized in FIGS. 15 and 16, i.e., looking directly down on plane nstp of FIG. 14. Reference is made to S-beam 1407 in FIG. 14 which is identical to beam 1401 except for its position relative to beam 1403 and therefore permits depicting a more detailed view of the connection of beams 1407 and 1403 than can be shown with beams 1401 and 1403. Before the attachment is made, the upper end of the S-beam terminates in the two frames jke and klu (FIG. 14), the two end struts jh and hl, and the connector strut hk. These members are respectively shown in FIG. 18 as frame 1810, consisting of struts 1811, 1812, and 1813, frame 1814, consisting of struts 1815, 1816, and 1817 (the latter two struts hidden by strut 1815), end struts 1818 (hidden by strut 1811) and 1820, and connector strut 1821.

The end struts contain their usual end fittings, strut 1818, visible in FIG. 20, having a vertex fitting $B_v$ at node h and a vertex fitting $C_v$ at node j and strut 1820 (FIG. 18) having a vertex fitting $C_v$ at node h and a vertex fitting $B_v$ at node l. Also, vertex fittings $B_v$ are present at nodes j and k. Hence, at all four terminal vertices, namely h, j, k, and l of beam 1401 there is a complete set of three vertex fittings. Specifically, at node h (FIG. 20) are the vertex fitting $A_v$ from frame 1822 (see also FIG. 14), a vertex fitting $C_v$, or more particularly, the combination of a rabbet 500 and connector member 400 as illustrated together in FIG. 6 from end strut 1820, and a vertex fitting $B_v$ from the end strut 1818; at node j (FIG. 18) are a vertex fitting $A_v$ from frame 1810, a vertex fitting $C_v$ or more particularly, the combination of a rabbet 500 and connector member 400 as illustrated together in FIG. 6 from end strut 1818 (FIG. 20), and a vertex fitting $B_v$ added to lock vertex fitting $A_v$ at node j; at node k are vertex fitting $A_v$ from frame 1814, a vertex fitting $C_v$ or more particularly, the combination of a rabbet 500 and connector member 400 as illustrated together in FIG. 6 from frame 1810, and an added vertex fitting $B_v$ to lock vertex fitting $A_v$ at node k; and at point l, a vertex fitting $A_v$ from frame ldg (FIG. 14), a vertex fitting $C_v$ or more particularly, the combination of a rabbet 500 and connector member 400 as illustrated together in FIG. 6 from frame 1814, and a vertex fitting $B_v$ from end strut 1820.

The attachment of beam 1401 to beam 1403 is accomplished as follows with reference to FIGS. 18, 19, and 20. FIG. 20 shows an elevation view of FIG. 19, with the view direction similar to that described previously for FIG. 17, namely parallel to the long axis of beam 1403 and facing toward the right as illustrated in FIG. 19. Thus, beam 1403 is shown directly on end, with its cross-section bounded by nodes y, t and z. The attached beam 1401 extends toward right. It is first assumed that at each of nodes t, f, g, and z an attachment device such as illustrated in FIG. 9 is present rather than the conventional type vertex fitting $A_v$ in FIG. 1c. In point of fact, such attachment devices may be used throughout beam 1403. A total of six T-rabbet fittings 800 are attached to T-connectors 400 located at nodal points t, f, g, and z, specifically one each, 800b, at nodes t and f and two each at nodes z and g. At nodes t and f, the fittings 800b are in the plane tfkj and at nodes z and g, fittings 800d are in the plane zglh and 800e are in the plane zgjk.

The six rabbet fittings 800 provide a total of 12 sites for the attachment of struts, of which nine are utilized for connecting beam 1401 to beam 1403. The unused or open attachment sites are 1850 on the rabbet fitting 800 node t and 1852 and 1854 on the rabbet fittings 800d and 800e, respectively, at node z. It is noted that for the specific example illustrated in FIGS. 14, 18, and 19, in which T-beam 1405 and S-beam 1401 share a common node, t, in their attachment to t-beam 1403, the T-rabbet fitting at node t provides attachment sites for struts 1624 of FIG. 16 as well as 1826 of FIG. 19.

With reference to FIGS. 19 and 20, the nine struts 1826, 1828, 1830, 1832, 1834, 1836, 1838, 1840, and 1842 are attached between the two beams. All of these struts can be seen in FIGS. 19 and 20 except 1832 (hidden beneath 1830 in FIG. 19), 1838 (hidden behind 1834 in FIG. 20, and 1840 (hidden beneath 1836 in FIG. 19). The latter three struts are visible in FIG. 14, however, strut 1832 extending between nodes g and l, strut 1838 between nodes g and k, and strut 1840 between nodes g and h.

The specific connections are: strut 1826 to fitting 800b (site 1626) at node t and vertex fitting $B_y$ at node j; strut 1828 to fitting 800b (site 1860) at node f and vertex fitting $B_y$ at node k; strut 1830 to fitting 800d (site hidden beneath 1856 of fitting 800e) at node z to vertex fitting $B_y$ at node h; strut 1832 to fitting 800d (site hidden beneath site 1866) at node g; strut 1834 to fitting 800e (site 1856) at node z to vertex fitting $C_y$ at node j; strut 1836 to fitting 800b (site 1858) at node f to vertex fitting $B_y$ at node j; strut 1838 to fitting 800e (site 1866) at node g to vertex fitting $B_y$ at node k; strut 1840 to fitting 800d (site 1862) at node g to vertex fitting $B_y$ at node h; and strut 1842 to fitting 800e (site 1864) at point g to the connector 400 portion of the attachment fitting 600 at point j. This completes the description of the attachment of the two beams together.

Other beam connection modes, such as the attachment of the end of a T-beam to the side of an S-beam are accomplished in a related manner, the major difference being that S-type rabbet fittings are attached to the S-beam.

In general, when connections are made to an S-beam, S-rabbet members are used. When connections are made to a T-beam, T-rabbet members are employed. At a connection node between an S-and a T-beam, either type of rabbet member may be used.

While the apparatus disclosed herein has been described for use in attaching a plurality of previously constructed beams to one another, the present invention can also be used to "grow" a beam. Thus, when the attachment apparatus described herein is connected to the nodes of a complete beam, a new beam may be constructed or "grown" outward from the attachment nodes of the first beam.

The present invention is not limited to the attachment of beams to each other and it may also find use in attaching devices or other equipment to an existing truss beam. Connecting holes 450 of connector member 400 may, for example, be used to attach any device capable of being anchored by a bolt to a truss beam. Similarly, additional rabbet members may be attached to the connector member of an attachment device, thereby providing further attachment possibilities at connecting holes 534 and 536 of rabbet 500, FIG. 5, or connecting holes 834 and 836 of rabbet 800, FIG. 8, of each additional rabbet member so attached.

Having thus described the invention, numerous changes, substitutions, modifications and alterations of the described apparatus will now suggest themselves to those skilled in the art, all of which fall within the spirit and scope of the invention. Accordingly, it is intended that the invention be limited only by the scope of the appended claims.

What is claimed is:

1. An apparatus adapted for rigidly attaching a first truss beam of the type having a multilateral cross-section to a second truss beam oriented at a non-zero angle relative to said first truss beam, each of said beams being constructed of a plurality of triangular frame elements, each of said frame elements comprising first, second, and third multiple struts interconnected by means of first, second, and third vertex fittings disposed at first, second, and third vertices respectively of said frame element, a said first vertex fitting of one of said frame elements being connected to a said second vertex fitting of another frame element and a said third vertex fitting of still another frame element, said apparatus comprising:
   a first rabbet member having first and second opposed surfaces and a plurality of side surfaces extending therebetween, a first and a second one of said side surfaces each adapted for connection to a different one of said first, second and third struts and facing in a direction generally opposite to the direction of a third one of said side surfaces;
   a generally slab-like connector member having first and second substantially parallel opposed surfaces and including multiple connecting means for connecting multiple objects thereto; and
   means associated with said third side surface and with one of said multiple connecting means for attaching said rabbet member to said connector member to form an attachment device, said attachment device adapted to replace one of said vertex fittings.

2. The apparatus of claim 1 wherein said attachment device is positioned at said first vertex of at least one frame element of said first truss beam and further including means for attaching two of said first, second and third struts of said at least one frame element to said first and second rabbet side surfaces, respectively; and
   said connector member further including means for rigidly joining said attachment device to second and third frame elements of said first truss beam at the second and third vertex fittings respectively of said second and third frame elements.

3. The apparatus of claim 2 wherein said means for rigidly joining said attachment device includes a centrally positioned through hole in said connector member communicating between said connector first and second opposed surfaces, said through hole being capable of receiving an elongate pin attachable at opposite ends thereof to said second and third vertex fittings of said second and third frame elements respectively, said attachment device and second and third vertex fittings forming a node of said truss beam.

4. The apparatus of claim 1 wherein said connector member has a thickness dimension defined by the mutual spacing of said substantially parallel first and second opposed surfaces, and said connector member further includes at least one connector side surface extending between said connector first and second opposed surfaces;
   said means for joining said connector and rabbet members to each other comprising a slot in said third rabbet side surface extending between said rabbet first and second opposed surfaces, said slot being configured to accept said connector member in the thickness dimension of the latter and to provide a close fit therewith.

5. The apparatus of claim 1 wherein said connector member is configured as a disk having a continuous peripheral side surface.

6. The apparatus of claim 5 wherein said multiple connecting means are spaced around said peripheral side surface, said disk being dimensioned to accept a plurality of substantially identical rabbet members.

7. The apparatus of claim 1 wherein said connector member has at least three identically dimensioned, planar connector side surfaces extending between said connector first and second opposed surfaces.

8. The apparatus of claim 1 wherein said second truss beam includes at least one elongate connector strut having a free end and further including a second rabbet member similar to said first rabbet member connected to said free end of said elongate connector strut; and
   at least one of said multiple connecting means of said connector member being formed for attachment to said rabbet member in which said elongate connector strut terminates.

9. The apparatus of claim 8 wherein said at least one elongate connector strut free end comprises:
   an axial shaft bore;
   a connector pin including a free pin end, said connector pin slidably engaging said shaft bore, and being capable of completely retracting therewithin; and
   means for selectively extending said free pin end out of said shaft bore.

10. The apparatus of claim 9 wherein said shaft bore is closed at one end thereof; and
   said means for selectively extending said free pin end includes a compression spring positioned between an end of said connector pin opposite said free pin end and a closed end of said shaft bore of said elongate connector strut.

11. The apparatus of claim 9 and further including means for preventing said connector pin from rotating within said shaft bore.

12. The apparatus of claim 9 wherein said second rabbet side surface includes a connecting hole adapted for receiving said connector pin and wherein
   said means for selectively extending said free pin end out of said shaft bore includes means for engaging said connecting hole for attachment to said second rabbet member.

13. The apparatus of claim 12 wherein said free pin end and said second rabbet member each include a through hole transverse to the axis of said connector pin, said through holes being located for alignment with each other; and
   said apparatus further including a dowel for insertion into said aligned through holes to releasably attach said additional rabbet member and said connector struts to each other.

14. The apparatus of claim 12 wherein said shaft bore is closed at one end thereof; and
   said means for selectively extending said free pin end includes a compression spring positioned between an end of said connector pin opposite said free pin end and a closed end of said shaft bore of said elongate connector strut.

15. The apparatus of claim 12 and further including means for preventing said connector pin from rotating within said shaft bore.

* * * * *